(12) United States Patent
Izumi

(10) Patent No.: US 11,317,082 B2
(45) Date of Patent: Apr. 26, 2022

(54) INFORMATION PROCESSING APPARATUS AND INFORMATION PROCESSING METHOD

(71) Applicant: SONY CORPORATION, Tokyo (JP)

(72) Inventor: Nobuaki Izumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/961,427

(22) PCT Filed: Oct. 25, 2018

(86) PCT No.: PCT/JP2018/039717
§ 371 (c)(1),
(2) Date: Jul. 10, 2020

(87) PCT Pub. No.: WO2019/146194
PCT Pub. Date: Aug. 1, 2019

(65) Prior Publication Data
US 2020/0359007 A1 Nov. 12, 2020

(30) Foreign Application Priority Data

Jan. 25, 2018 (JP) .............................. JP2018-010471

(51) Int. Cl.
*H04N 13/344* (2018.01)
*H04N 13/194* (2018.01)
*H04N 13/275* (2018.01)

(52) U.S. Cl.
CPC ......... *H04N 13/344* (2018.05); *H04N 13/194* (2018.05); *H04N 13/275* (2018.05)

(58) Field of Classification Search
None
See application file for complete search history.

(56) References Cited

U.S. PATENT DOCUMENTS

| | | | |
|---|---|---|---|
| 2005/0117215 A1* | 6/2005 | Lange | G06T 15/04 359/462 |
| 2011/0285715 A1 | 11/2011 | Li et al. | |
| 2012/0182403 A1* | 7/2012 | Lange | H04N 13/363 348/51 |

(Continued)

FOREIGN PATENT DOCUMENTS

| | | |
|---|---|---|
| CN | 102255930 A | 11/2011 |
| JP | 2001-143103 A | 5/2001 |
| JP | 2007-507945 A | 3/2007 |

(Continued)

OTHER PUBLICATIONS

International Search Report and Written Opinion of PCT Application No. PCT/JP2018/039717, dated Jan. 22, 2019, 10 pages of ISRWO.

*Primary Examiner* — Talha M Nawaz
(74) *Attorney, Agent, or Firm* — Chip Law Group

(57) ABSTRACT

An information processing apparatus that includes a receiving unit that receives a request including load information regarding a load and a sending unit that sends a data set in accordance with the request. The data set includes three-dimensional shape data, and left-eye texture data and right-eye texture data. The three-dimensional shape data has a vertex count corresponding to the load information. The left-eye texture data and the right-eye texture data correspond to the three-dimensional shape data.

14 Claims, 25 Drawing Sheets

(56) References Cited

U.S. PATENT DOCUMENTS

2013/0100132 A1* 4/2013 Katayama ............ H04N 13/275
           345/420
2015/0310662 A1  10/2015 Arcas et al.

FOREIGN PATENT DOCUMENTS

| JP | 2013-533529 A | 8/2013 |
| WO | 2005/034527 A1 | 4/2005 |
| WO | 2011/144464 A2 | 11/2011 |

* cited by examiner

[FIG. 1]
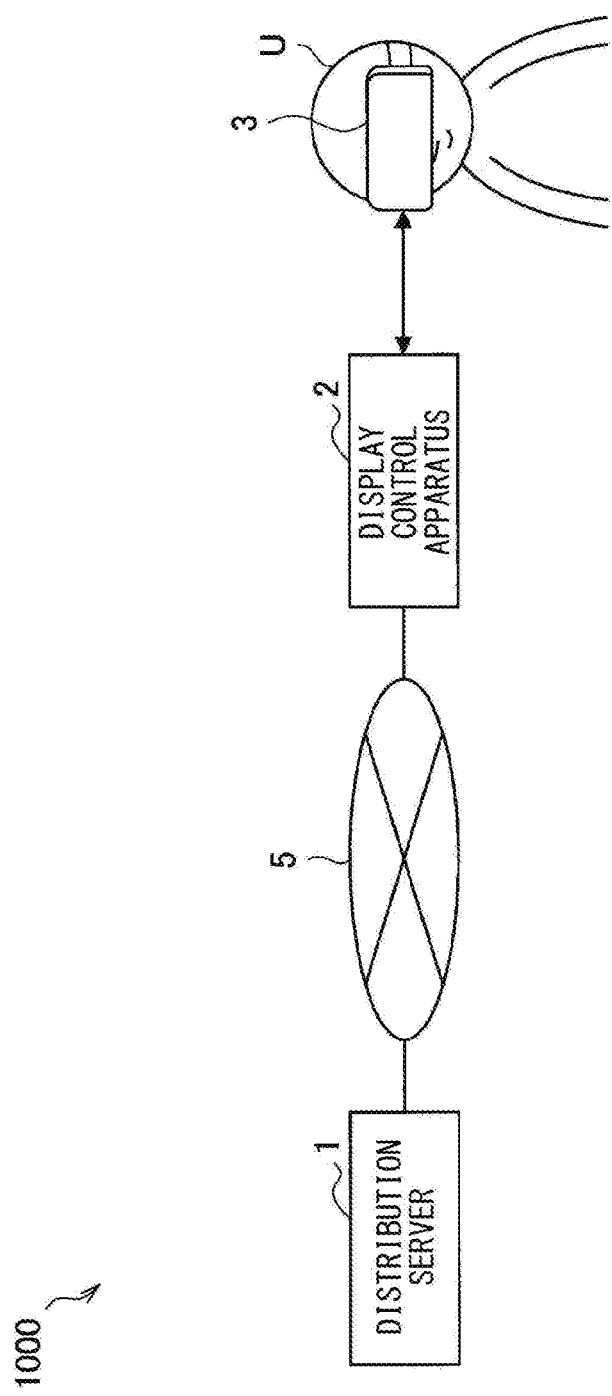

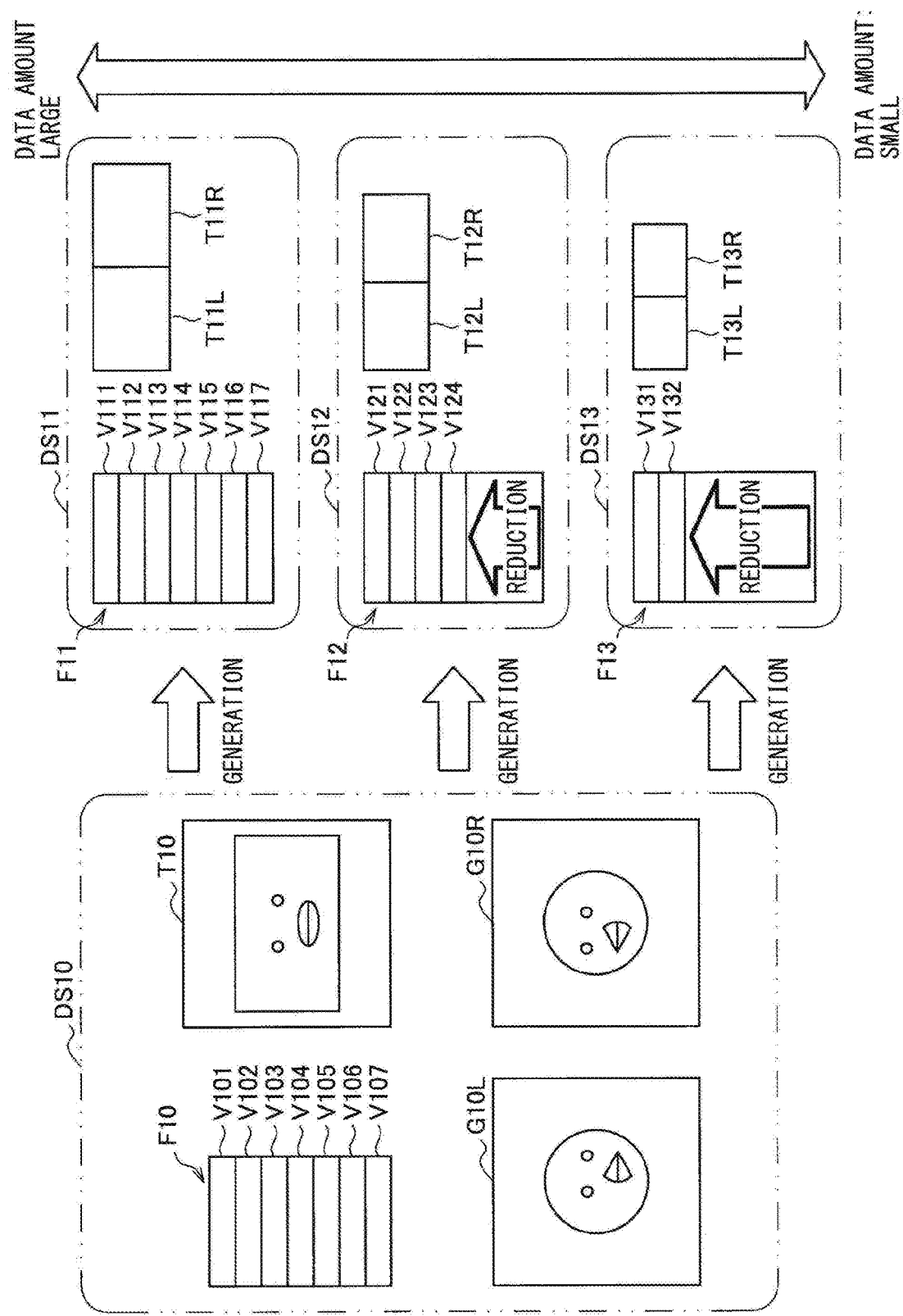

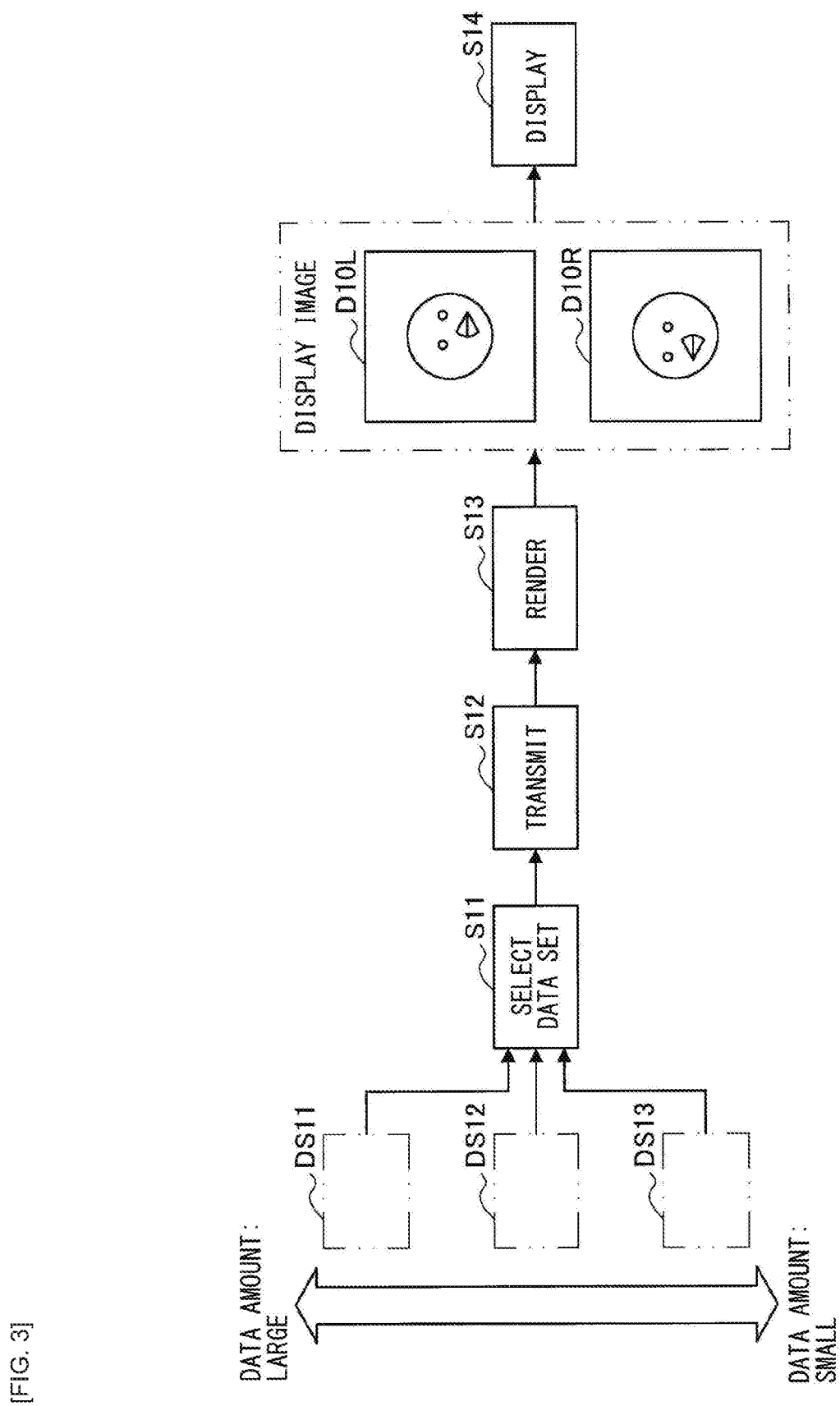

[FIG. 4]
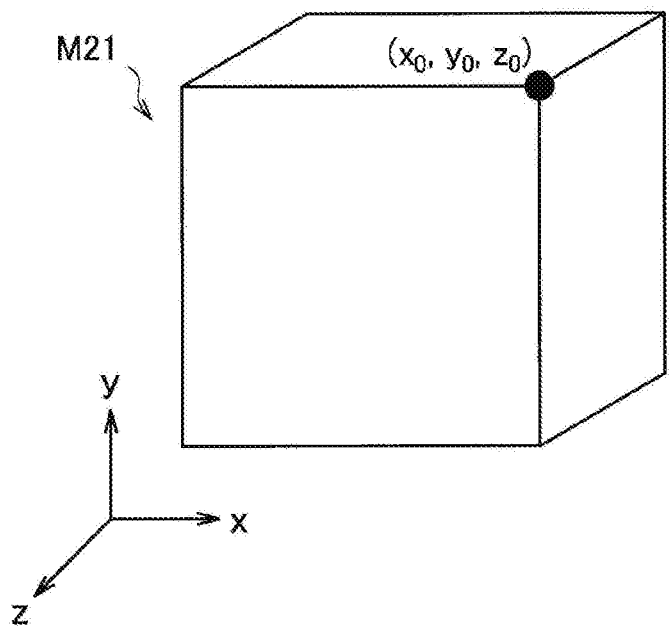
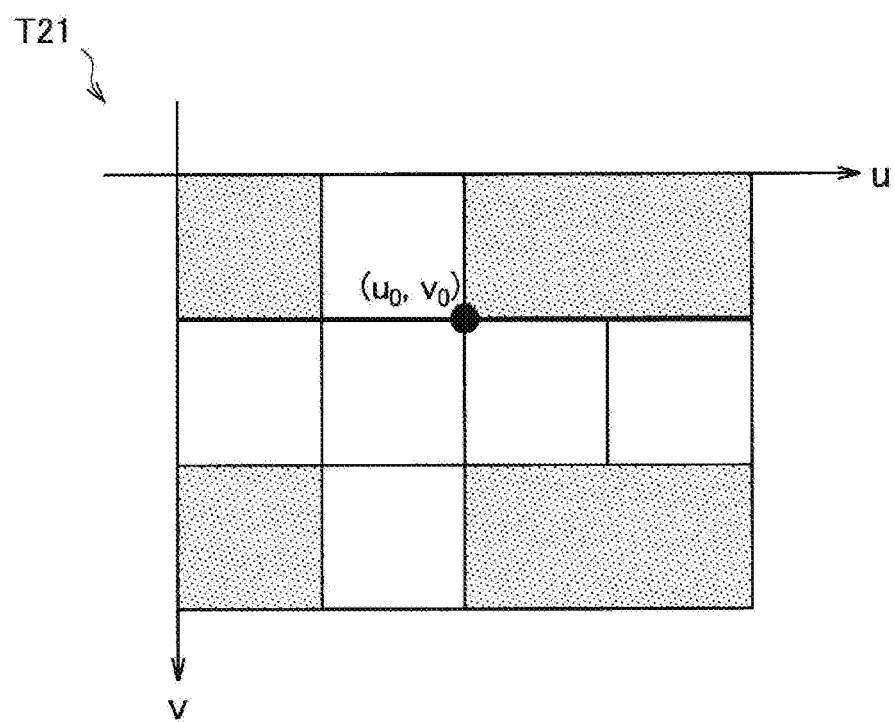

[FIG. 5]

| | | | | |
|---|---|---|---|---|
| $x_0$ | $y_0$ | $z_0$ | $u_0$ | $v_0$ |
| $x_1$ | $y_1$ | $z_1$ | $u_1$ | $v_1$ |
| $x_2$ | $y_2$ | $z_2$ | $u_2$ | $v_2$ |
| ⋮ | ⋮ | ⋮ | ⋮ | ⋮ |
| $x_{N-1}$ | $y_{N-1}$ | $z_{N-1}$ | $u_{N-1}$ | $v_{N-1}$ |

F21

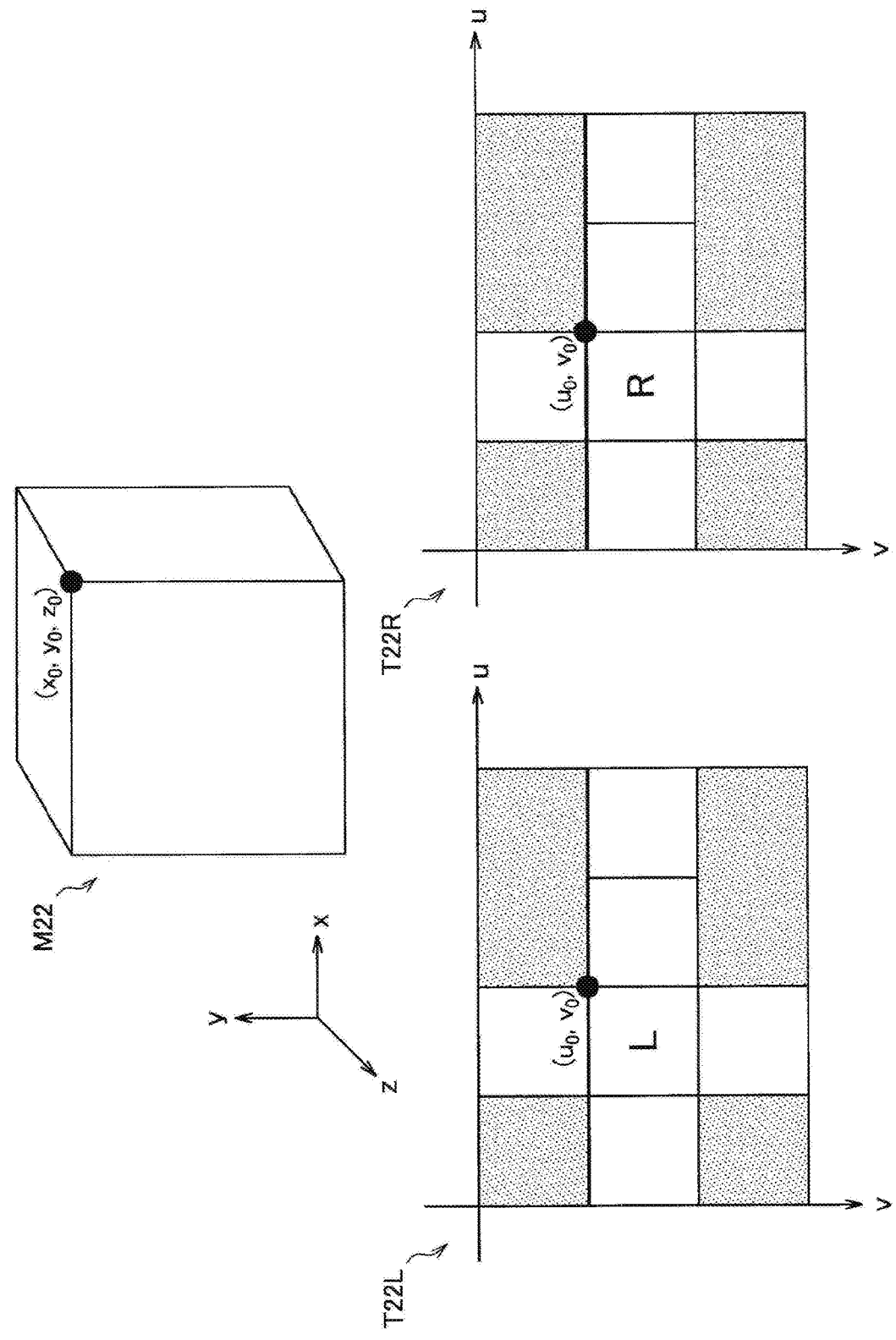
[FIG. 6]

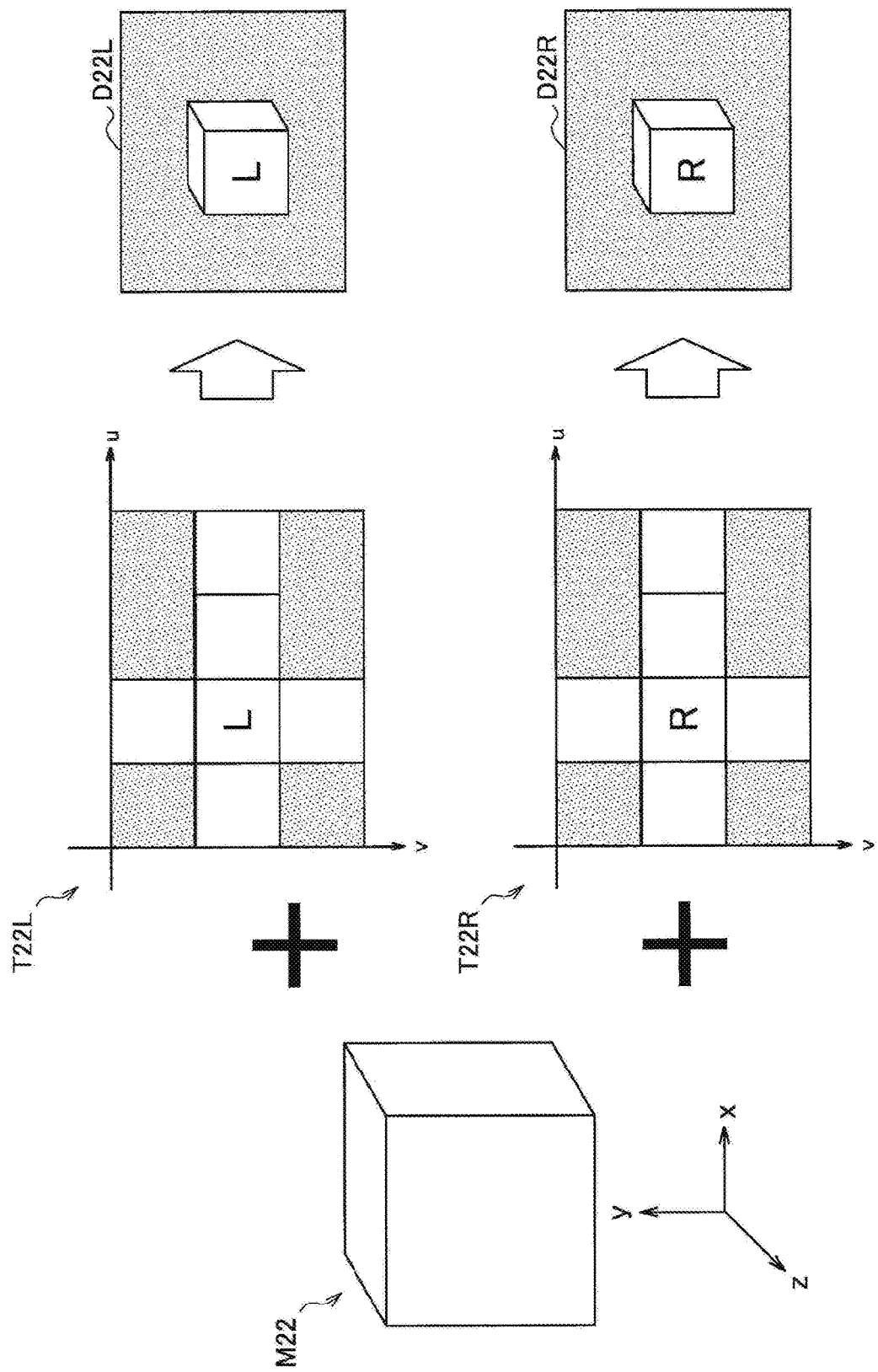

[FIG. 8]
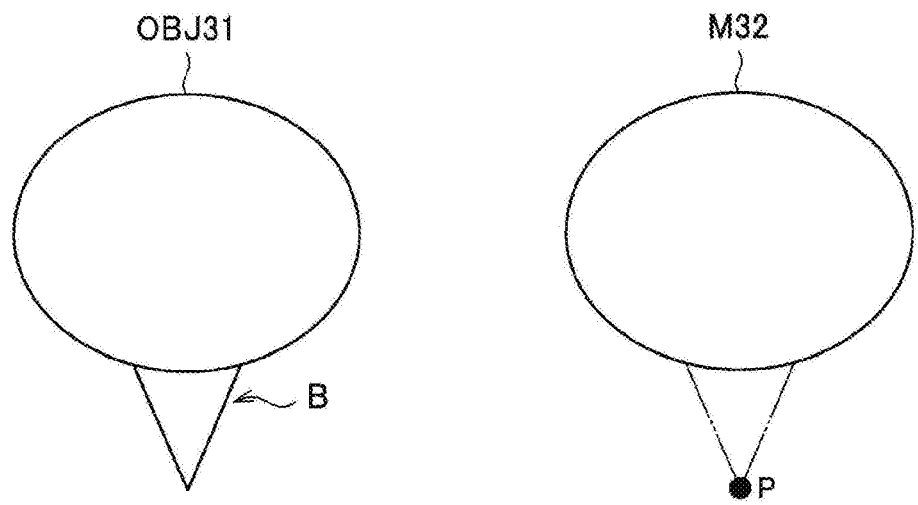
[FIG. 9]
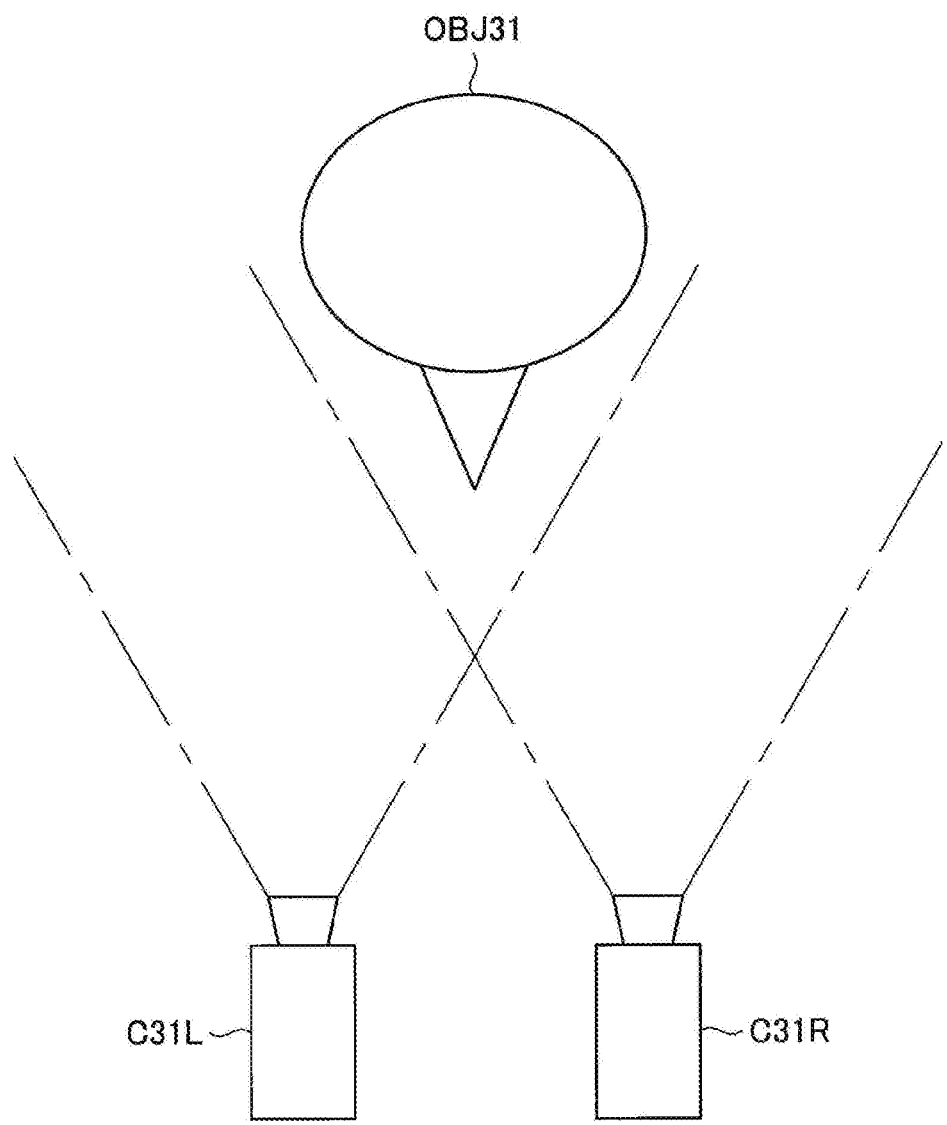

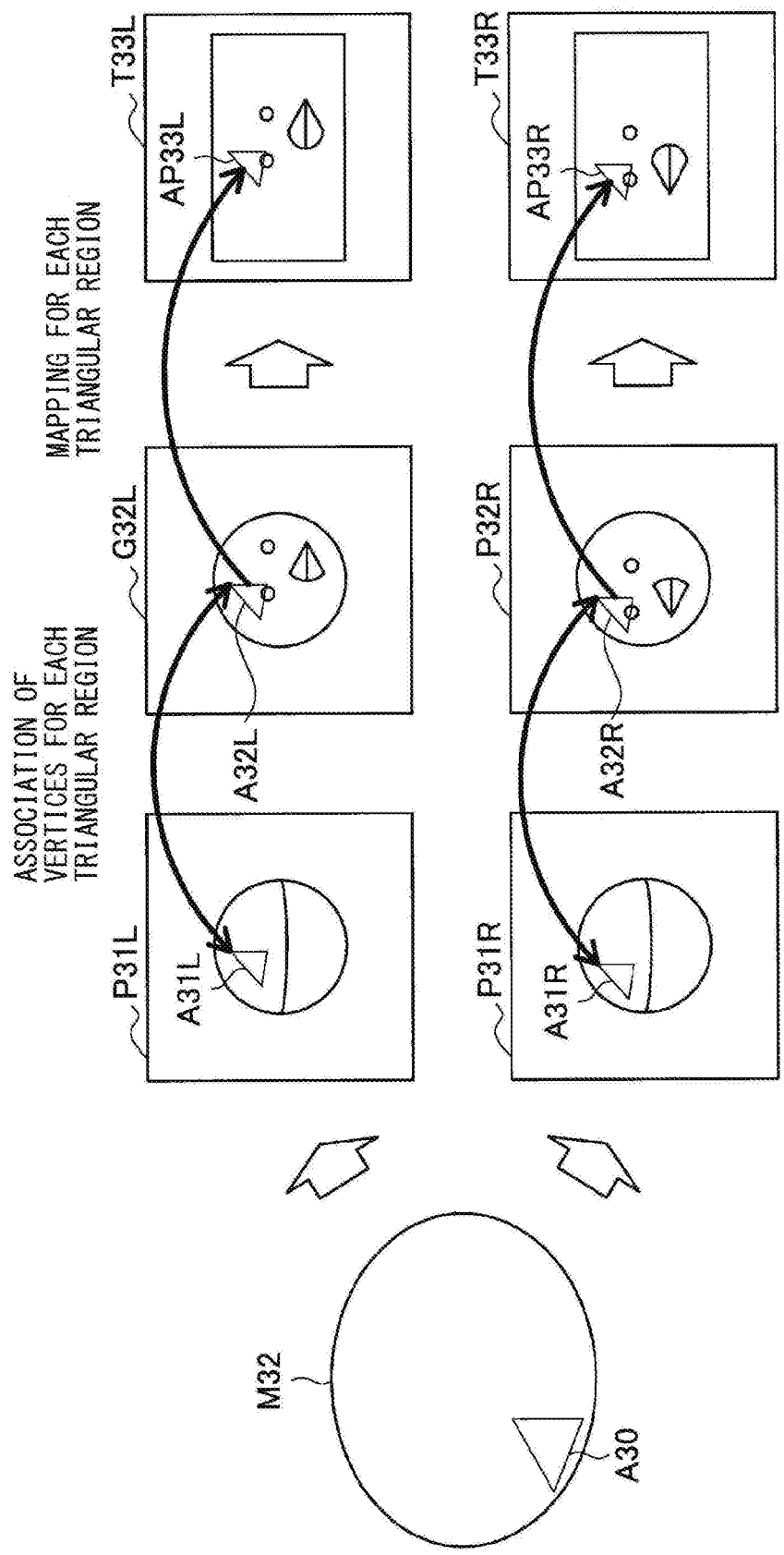

[FIG. 11]
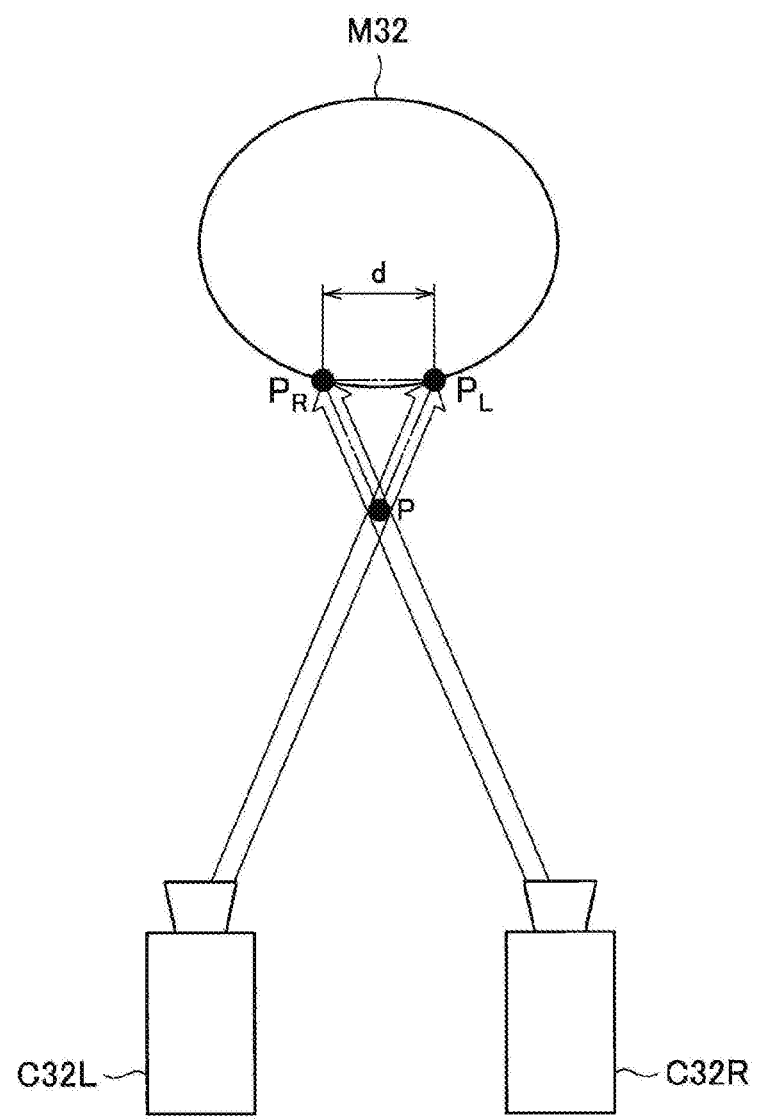

[FIG. 12]
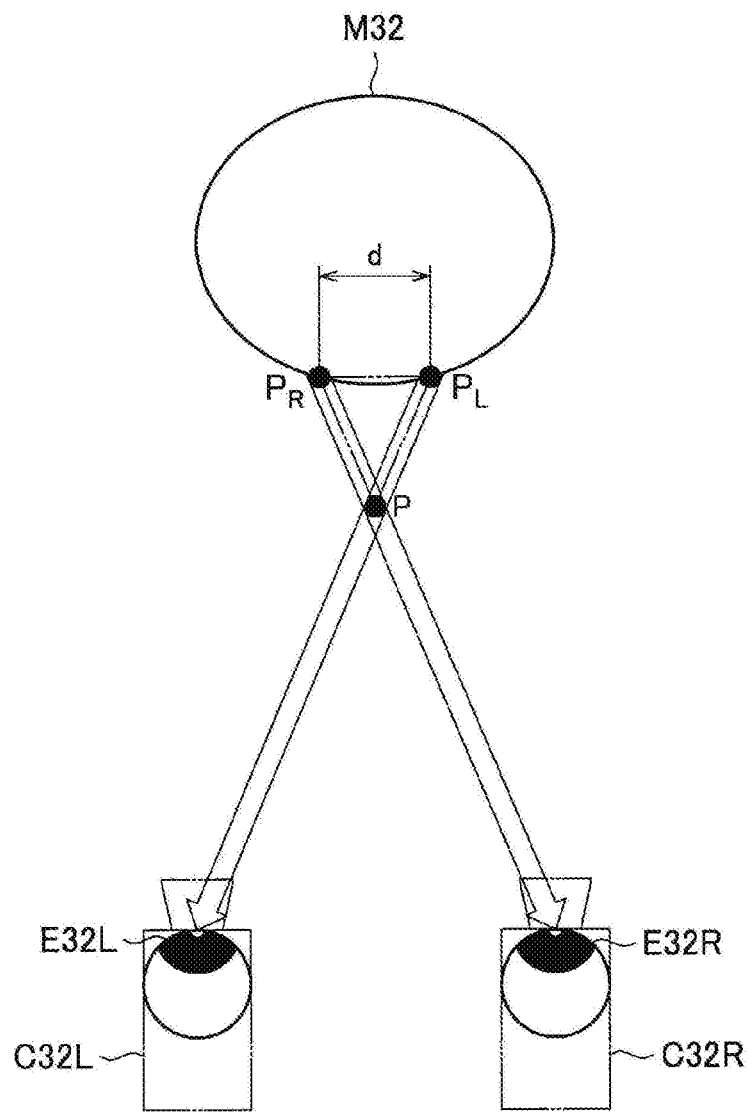

[FIG. 13]
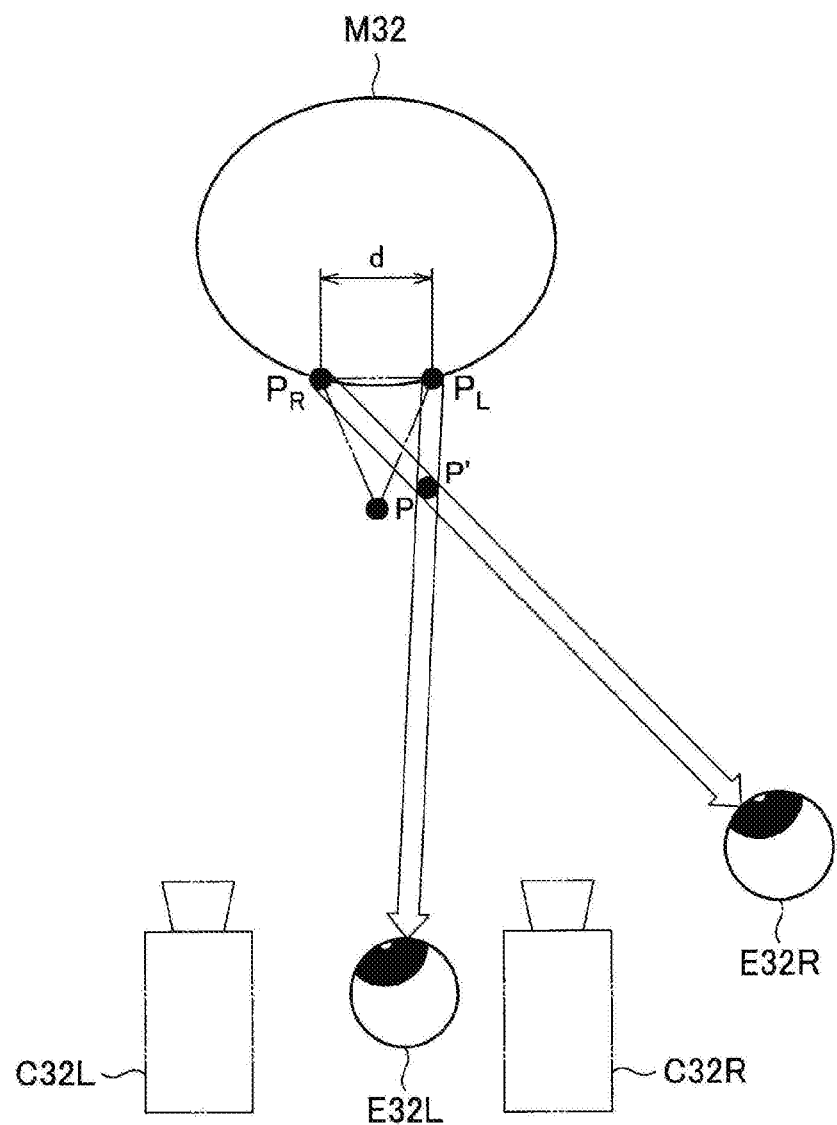

[FIG. 14]
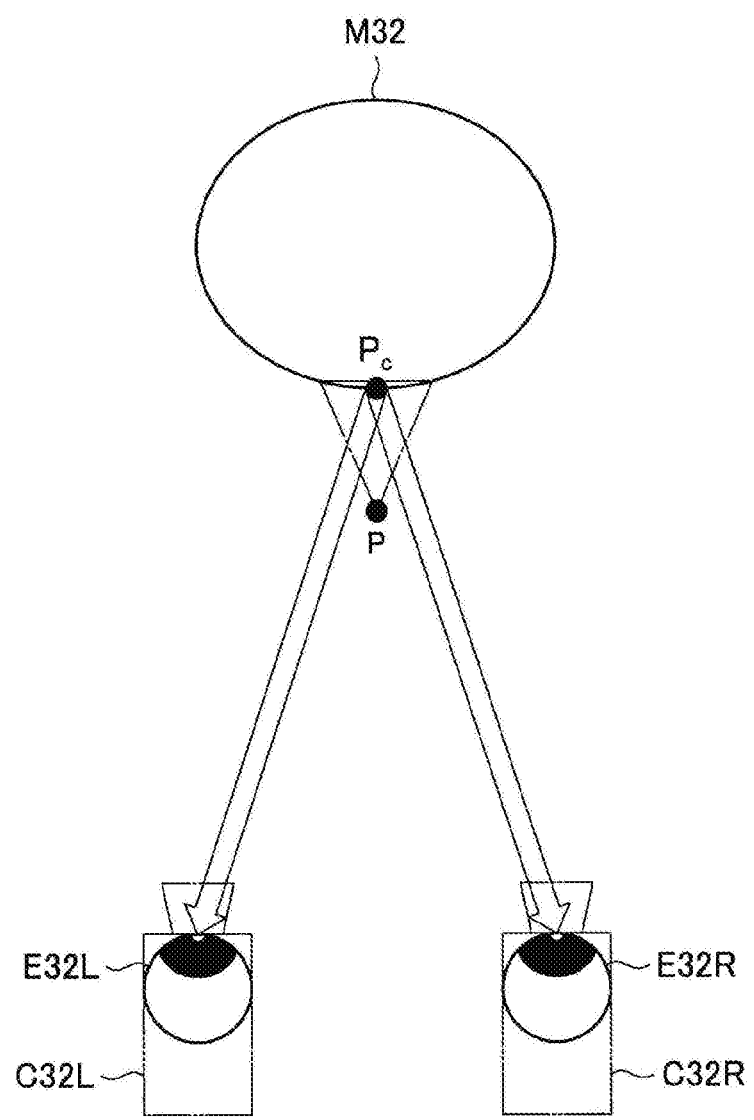

[FIG. 15]
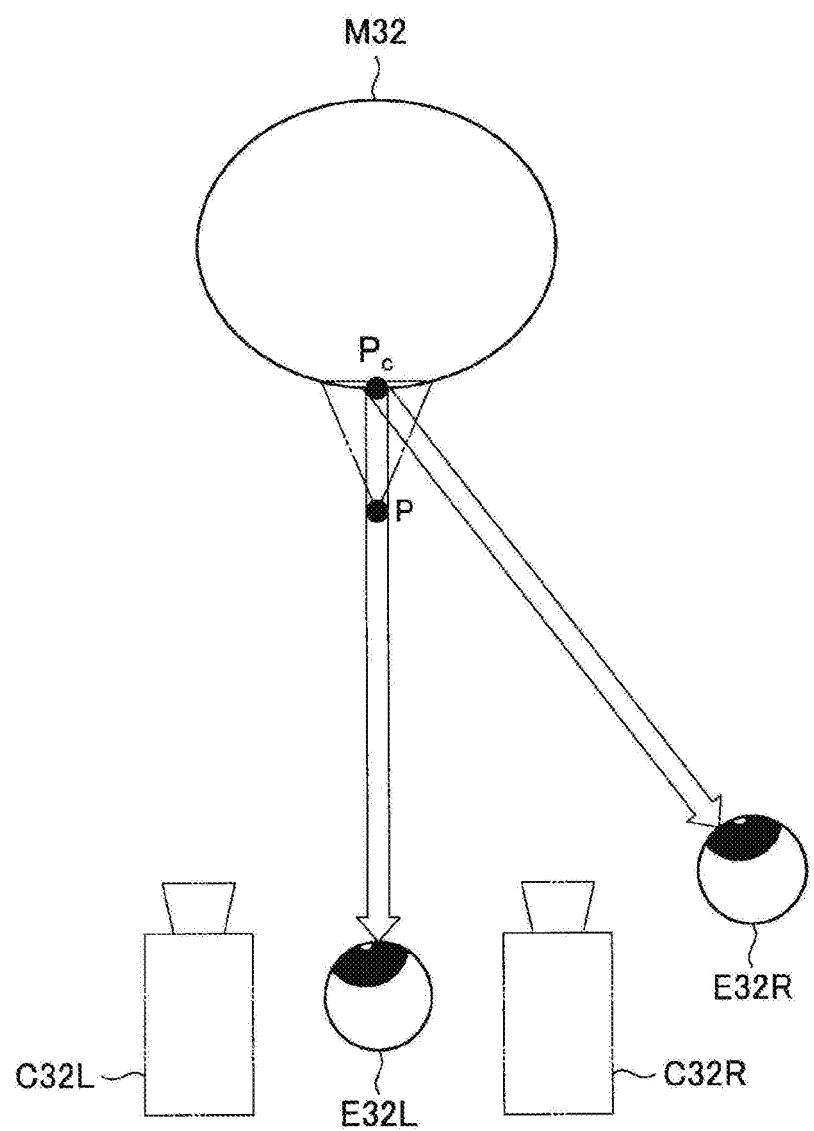

[FIG. 16]
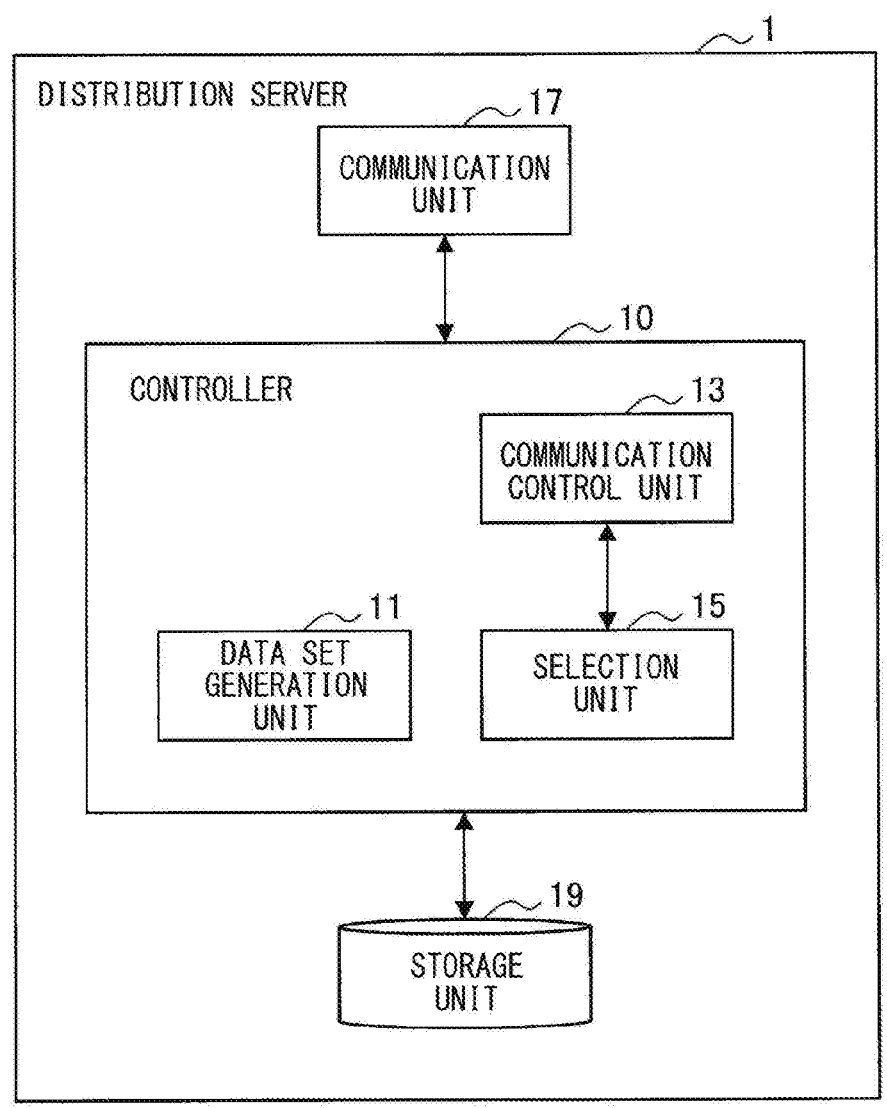

[FIG. 17]
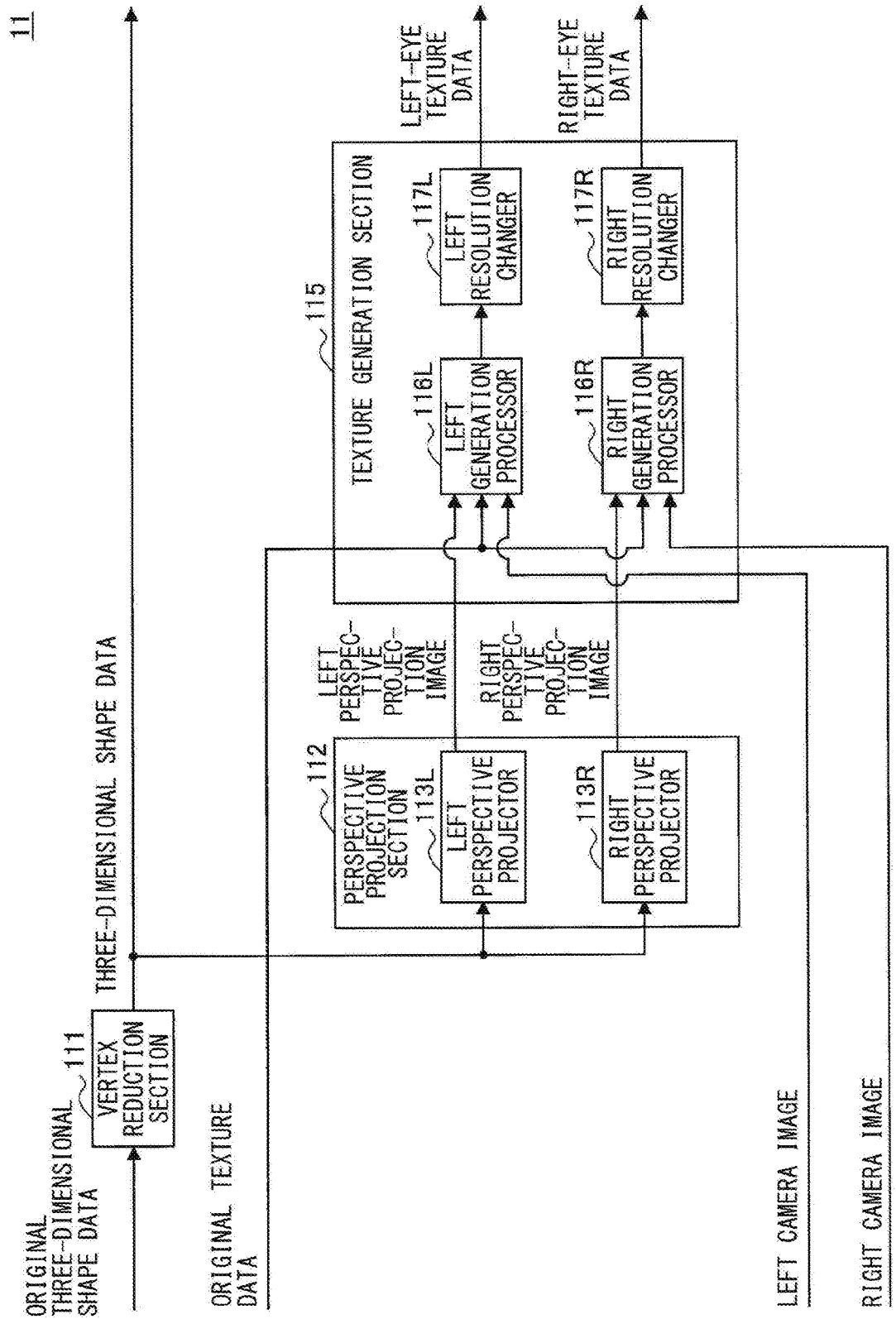

[FIG. 18]
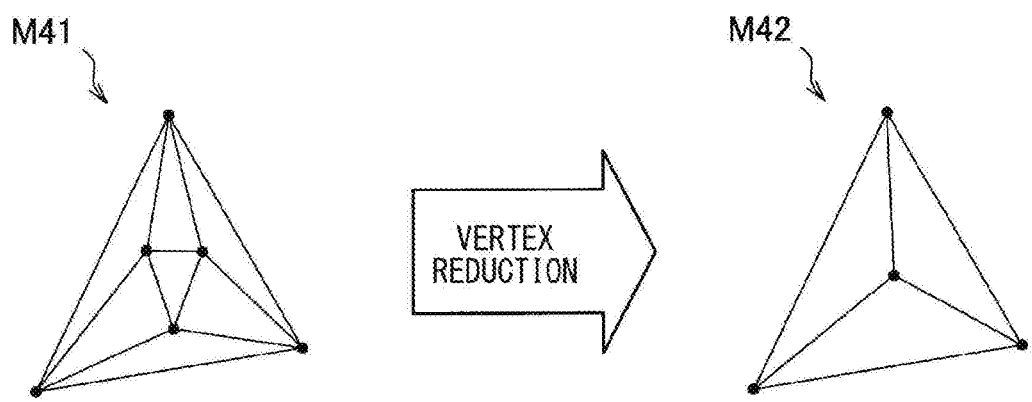

[FIG. 19]
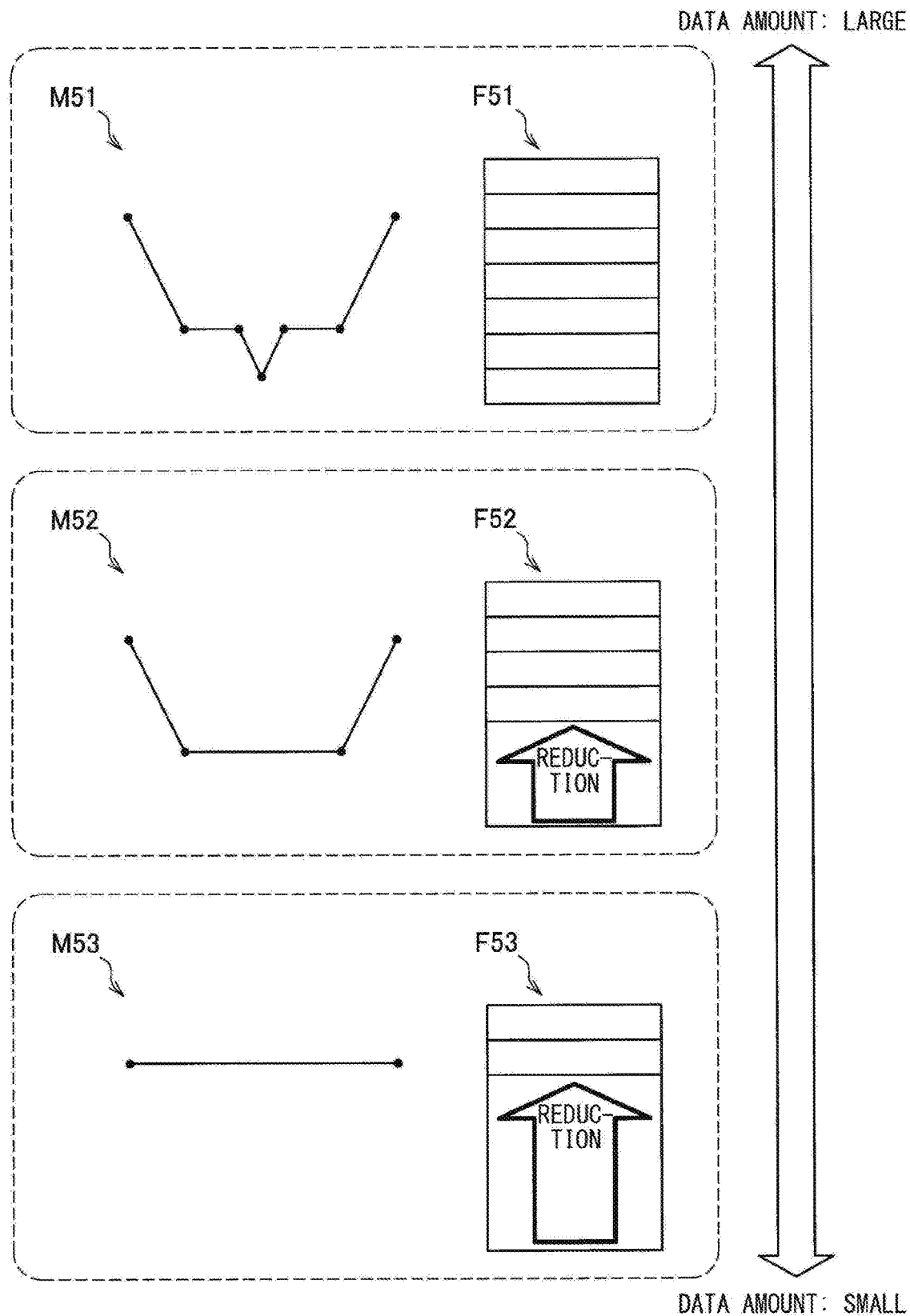

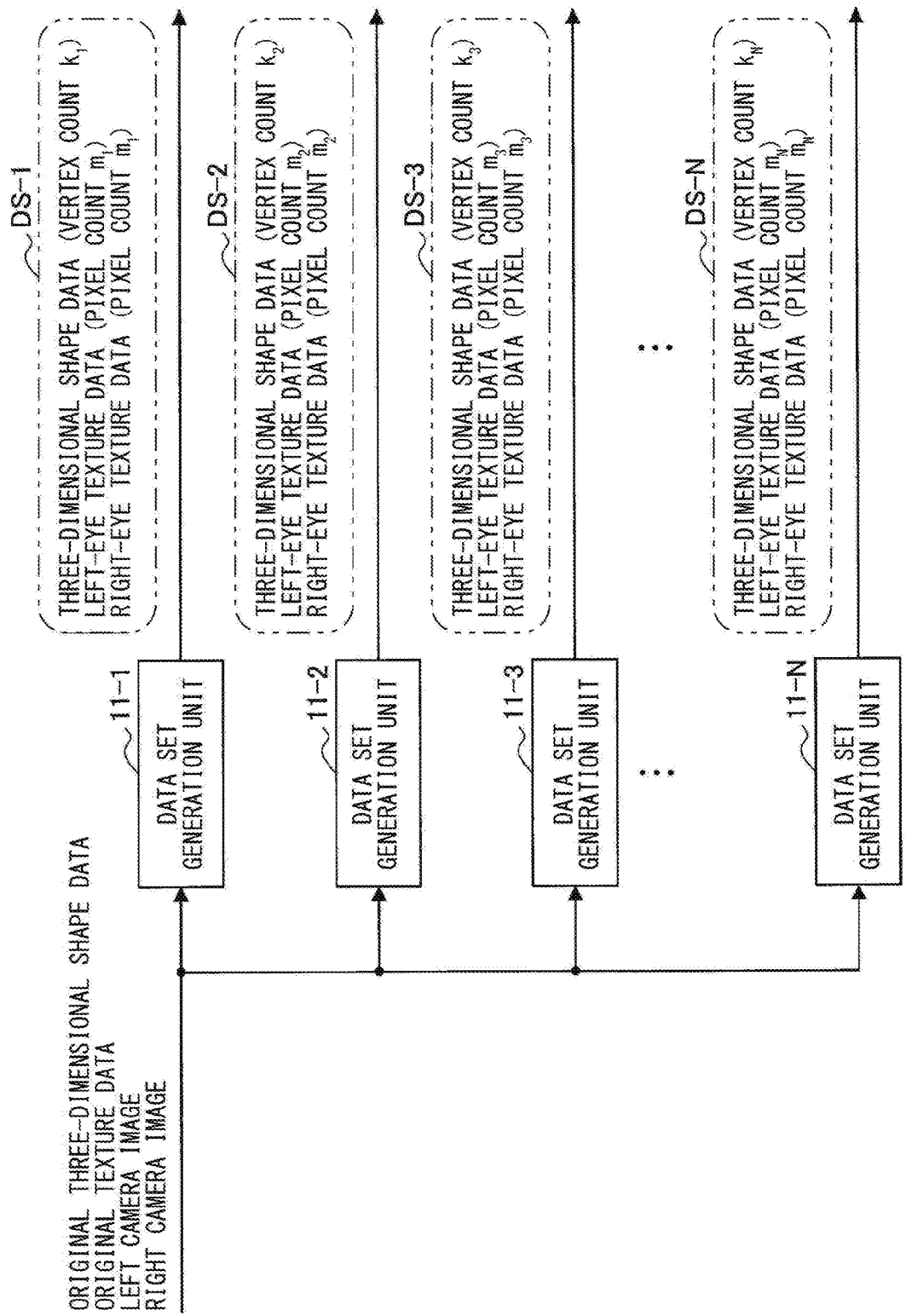

[FIG. 21]
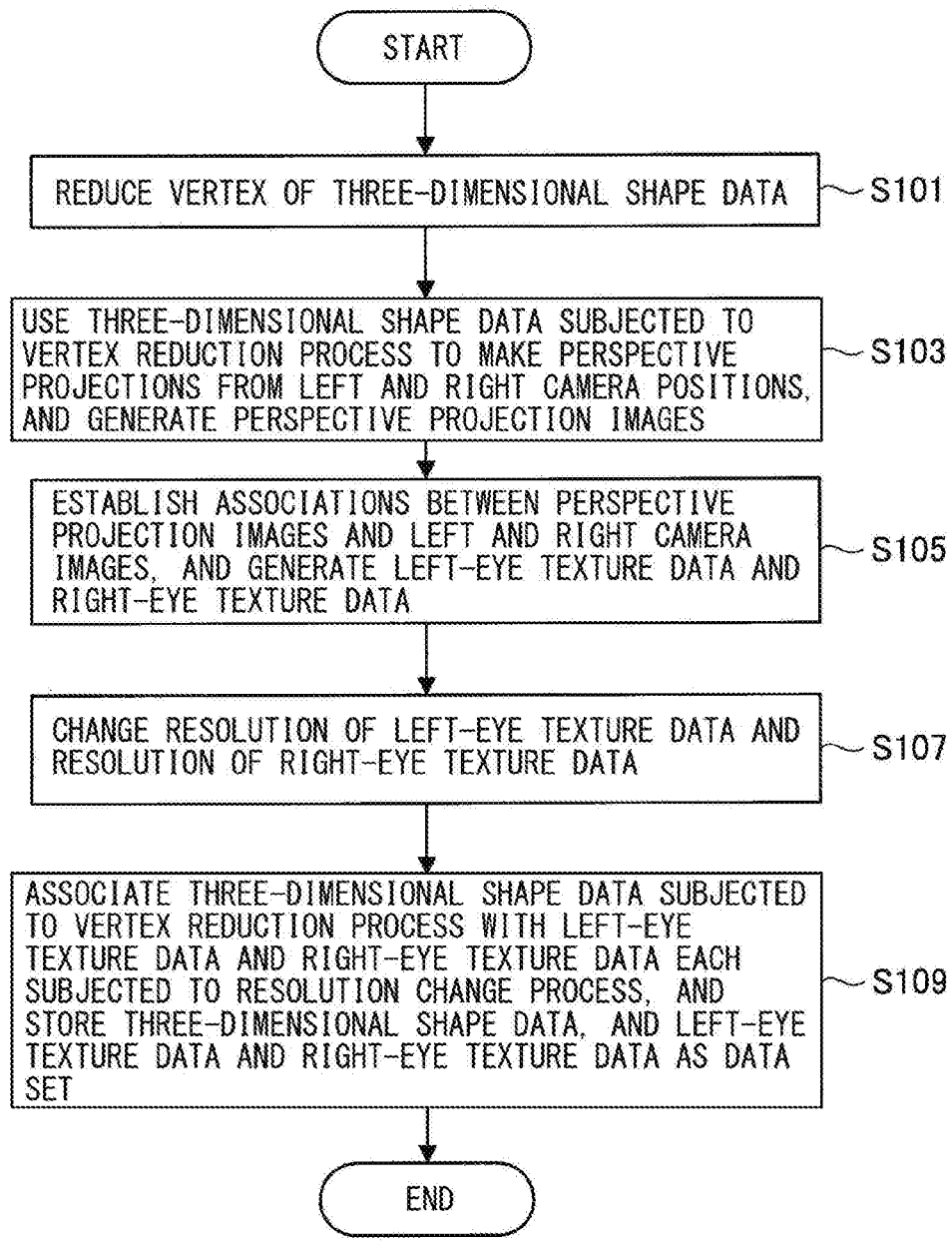

[FIG. 22]
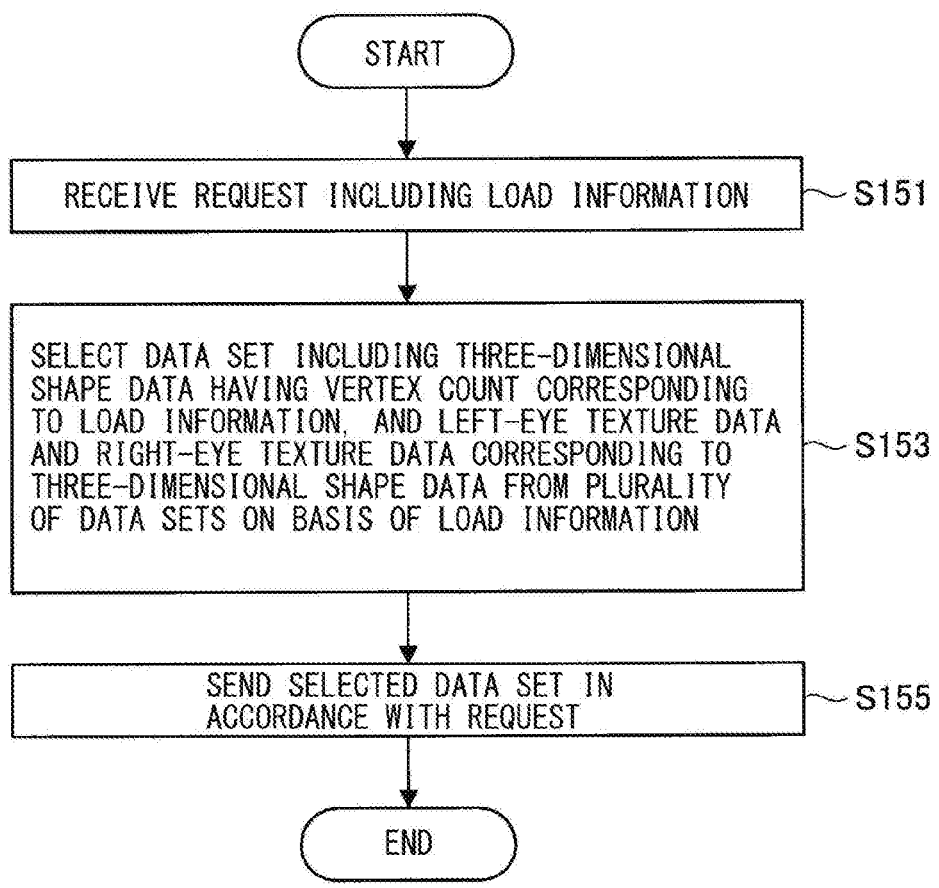

[FIG. 23]
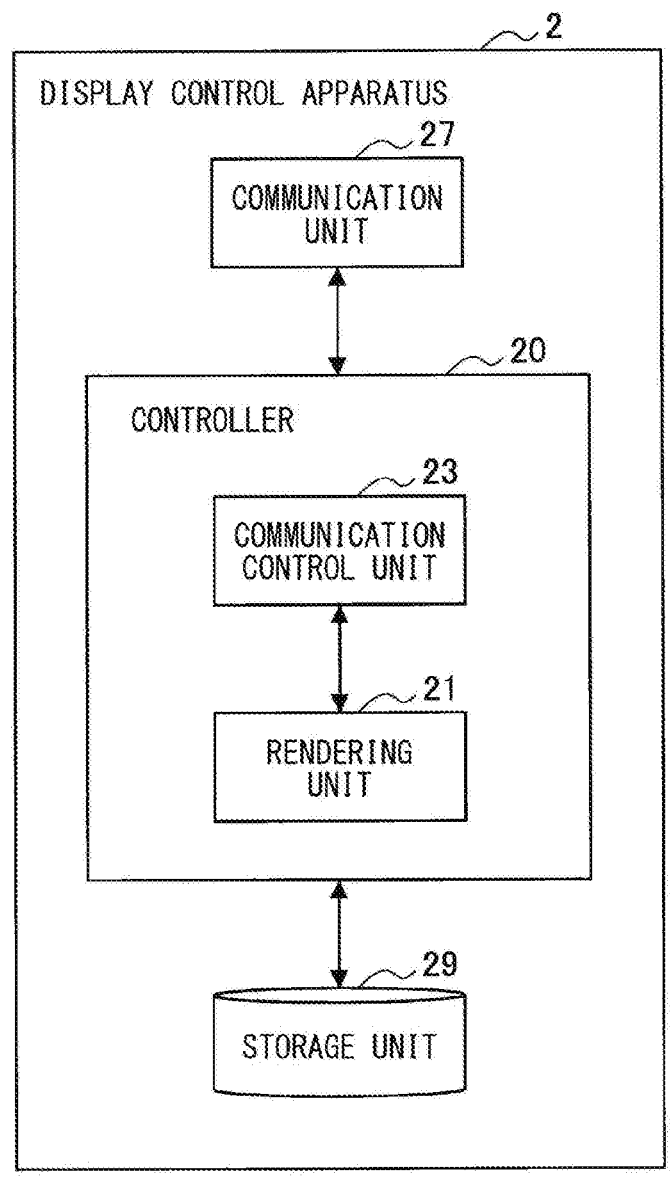

[FIG. 24]
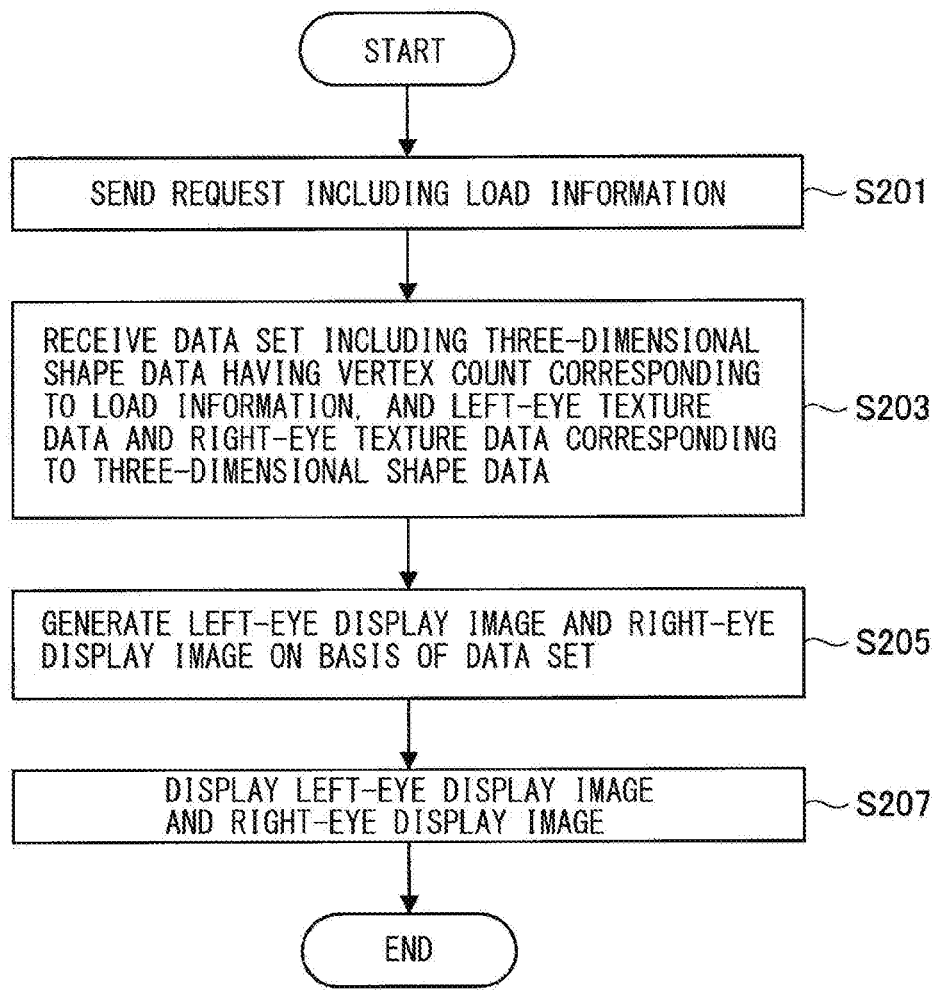

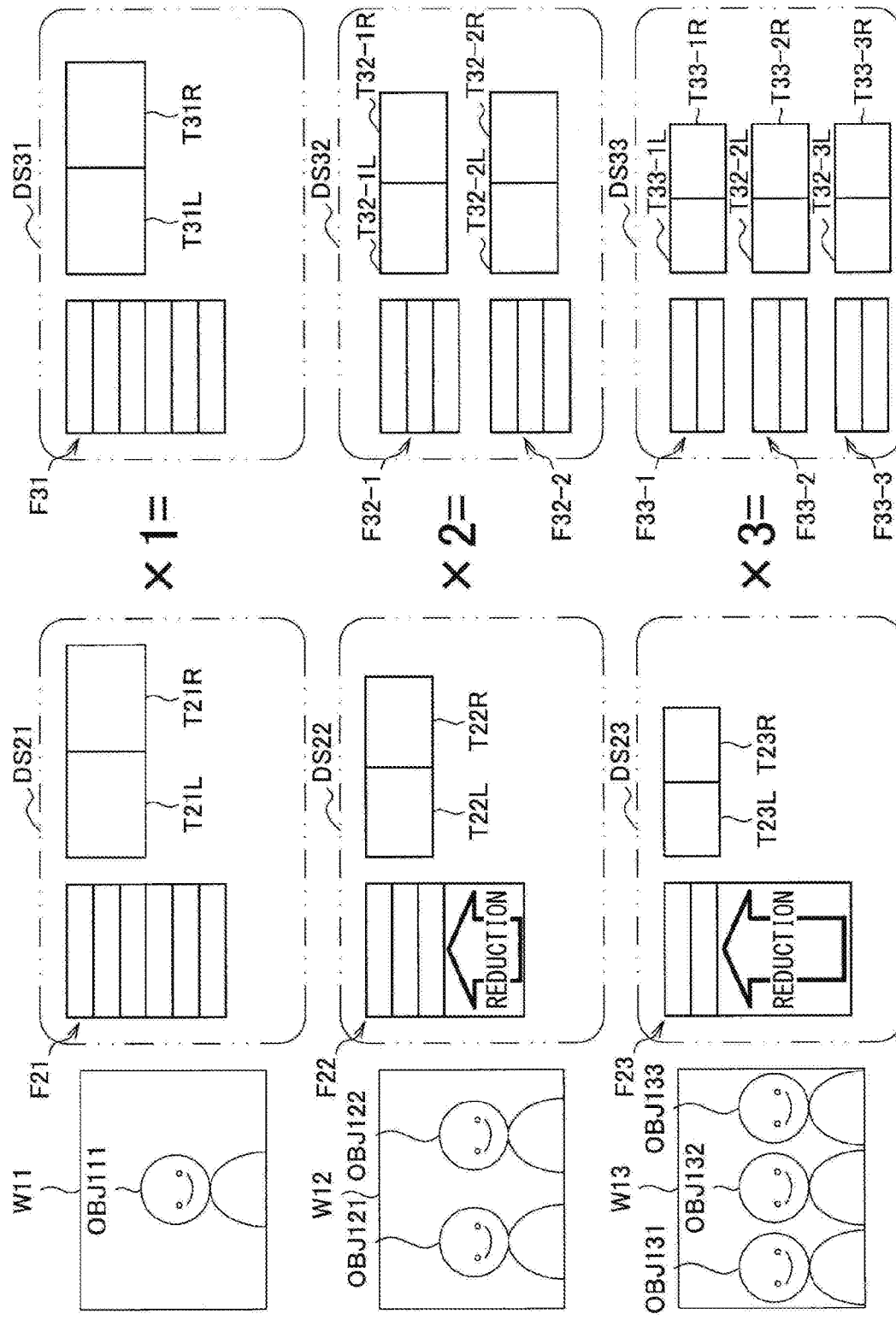
[FIG. 25]

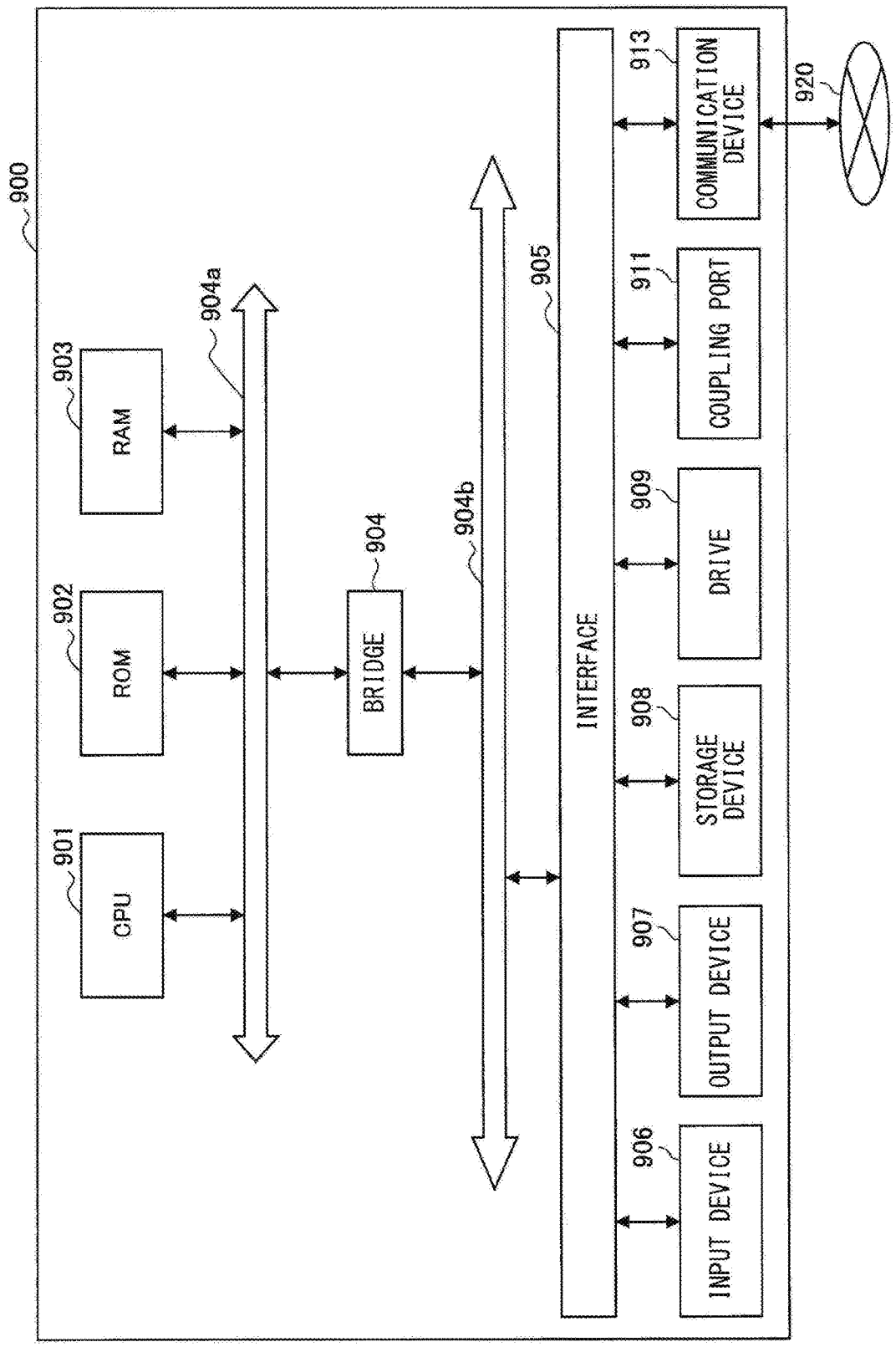
[FIG. 26]

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/039717 filed on Oct. 25, 2018, which claims priority benefit of Japanese Patent Application No. JP 2018-010471 filed in the Japan Patent Office on Jan. 25, 2018. Each of the above-referenced applications is hereby incorporated herein by reference in its entirety.

TECHNICAL FIELD

The present disclosure relates to an information processing apparatus and an information processing method.

BACKGROUND ART 3D movies, 3D television, and the like each use a mechanism that has a left eye and a right eye view different images and uses the binocular parallax between the images to provide a user with a stereoscopic effect. Further, some techniques use HMDs (Head Mounted Displays) or the like mounted on the heads of users to reproduce motion parallax.

Images viewed from different viewpoints are required to reproduce motion parallax because it is necessary to move a viewpoint in accordance with the head position or the like of a user. Examples thereof include a technique for rendering (generating) an image viewed from each viewpoint by detecting/recording information regarding the three-dimensional shape of an object and using a three-dimensional model reconfigured on the basis of the information as in PTL 1 below.

CITATION LIST

Patent Literature

PTL 1: Specification of U.S. Unexamined Patent Application Publication No. 2015/310662

SUMMARY OF THE INVENTION

Problems to be Solved by the Invention

In the technique as described above, three-dimensional shape data used for rendering, however, has a great influence on the subjective image quality of an image (display image) viewed from each viewpoint. Depending on the accuracy or the like of the three-dimensional shape data, the subjective image quality of the display image may thus decrease.

Accordingly, the present disclosure proposes a mechanism that makes it possible to suppress a decrease in the subjective image quality of a display image generated on the basis of three-dimensional shape data.

Means for Solving the Problems

According to the present disclosure, there is provided an information processing apparatus including: a receiving unit that receives a request including load information regarding a load; and a sending unit that sends a data set in accordance with the request. The data set includes three-dimensional shape data, and left-eye texture data and right-eye texture data. The three-dimensional shape data has a vertex count corresponding to the load information. The left-eye texture data and the right-eye texture data correspond to the three-dimensional shape data.

In addition, according to the present disclosure, there is provided an information processing apparatus including: a sending unit that sends a request including load information regarding a load; a receiving unit that receives a data set including three-dimensional shape data, and left-eye texture data and right-eye texture data; and a rendering unit that generates a left-eye display image and a right-eye display image on the basis of the data set. The three-dimensional shape data has a vertex count corresponding to the load information. The left-eye texture data and the right-eye texture data correspond to the three-dimensional shape data.

In addition, according to the present disclosure, there is provided an information processing method including: receiving a request including load information regarding a load; and causing, by a processor, a data set to be sent in accordance with the request. The data set includes three-dimensional shape data, and left-eye texture data and right-eye texture data. The three-dimensional shape data has a vertex count corresponding to the load information. The left-eye texture data and the right-eye texture data correspond to the three-dimensional shape data.

Effects of the Invention

According to the present disclosure as described above, it is possible to suppress a decrease in the subjective image quality of a display image generated on the basis of three-dimensional shape data.

It is to be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 1 is an explanatory diagram schematically illustrating a configuration of a transmission system according to an embodiment of the present disclosure.

FIG. 2 is a schematic diagram schematically illustrating a flow of a process of generating a data set according to the embodiment.

FIG. 3 is a schematic diagram schematically illustrating a flow of a data transmission process according to the embodiment.

FIG. 4 is an explanatory diagram for describing an association between a vertex of a three-dimensional model and a single piece of texture data.

FIG. 5 is a diagram illustrating an example of a data structure of three-dimensional shape data.

FIG. 6 is an explanatory diagram for describing an association between the vertex of the three-dimensional model and texture data in the embodiment.

FIG. 7 is a schematic diagram for describing rendering that uses stereo texture data in the embodiment.

FIG. 8 is an explanatory diagram for describing an error in a three-dimensional model.

FIG. 9 is a schematic diagram schematically illustrating imaging by a stereo camera.

FIG. 10 is a schematic diagram schematically illustrating a flow of a process of generating texture data.

FIG. 11 is a schematic diagram illustrating a relationship between a three-dimensional model including an error and the stereo camera.

FIG. 12 is a schematic diagram illustrating a viewing and listening situation in which a camera position and a position of an eye of a user match each other.

FIG. 13 is a schematic diagram illustrating a viewing and listening situation in which the camera position and the position of the eye of the user are different from each other.

FIG. 14 is an explanatory diagram for describing a comparative example.

FIG. 15 is an explanatory diagram for describing the comparative example.

FIG. 16 is a block diagram illustrating an example of a configuration of a distribution server 1 according to the embodiment.

FIG. 17 is a block diagram illustrating an example of a configuration of a data set generation unit 11.

FIG. 18 is an explanatory diagram illustrating a vertex reduction process by a vertex reduction section 111.

FIG. 19 is a schematic diagram illustrating gradual vertex reduction.

FIG. 20 is a schematic diagram schematically illustrating that data sets are generated in parallel in a case where a controller 10 includes a plurality of data set generation units 11.

FIG. 21 is a flowchart illustrating an operation example of the distribution server 1 for generating a data set.

FIG. 22 is a flowchart illustrating an operation example of the distribution server 1 for transmitting a data set.

FIG. 23 is a block diagram illustrating a configuration example of a display control apparatus 2 according to the present embodiment.

FIG. 24 is a flowchart illustrating an operation example of the display control apparatus 2.

FIG. 25 is an explanatory diagram for describing a modification example 1.

FIG. 26 is a block diagram illustrating a hardware configuration example.

MODES FOR CARRYING OUT THE INVENTION

The following describes a preferred embodiment of the present disclosure in detail with reference to the accompanying drawings. It is to be noted that, in this description and the accompanying drawings, components that have substantially the same functional configuration are indicated by the same reference signs, and thus redundant description thereof is omitted.

It is to be noted that description is given in the following order.

<<1. System Overview>>
<1-1. Configuration>
<1-2. Flow of Process>
<<2. Principle according to the Present Technology>>
<<3. Distribution Server>>
<3-1. Configuration>
<3-2. Operation>
<<4. Display Control Apparatus>>
<4-1. Configuration>
<4-2. Operation>
<<5. Modification Example>>
<5-1. Modification Example 1>
<5-2. Modification Example 2>
<5-3. Modification Example 3>
<5-4. Modification Example 4>

<<6. Hardware Configuration Example>>
<<7. Conclusion>>

1. System Overview 1-1. Configuration

First, an overview of an information processing system according to an embodiment of the present disclosure is described with reference to FIG. 1. FIG. 1 is an explanatory diagram schematically illustrating the configuration of a transmission system according to the embodiment of the present disclosure.

As illustrated in FIG. 1, a transmission system 1000 according to the present embodiment is an information processing system including a distribution server 1, a display control apparatus 2, HMD 3, and a communication network 5. The transmission system 1000 according to the present embodiment provides a stereoscopic effect brought about by binocular parallax and motion parallax to a user U who is wearing the HMD 3 and viewing an image displayed on the HMD 3.

The distribution server 1 and the display control apparatus 2 are coupled via the communication network 5. It is possible to transmit and receive information between the distribution server 1 and the display control apparatus 2. In addition, the display control apparatus 2 and the HMD 3 are also coupled in a wired or wireless manner, and it is possible to transmit and receive information between the display control apparatus 2 and the HMD 3.

The communication network 5 is a wired or wireless transmission path for information sent from an apparatus coupled to the communication network 5. For example, the communication network 5 may include a public network such as the Internet, a telephone network, or a satellite communication network, and various LANs (Local Area Networks) including Ethernet (registered trademark), WAN (Wide Area Network), and the like. In addition, the communication network 5 may include a private network such as IP-VPN (Internet Protocol-Virtual Private Network).

The distribution server 1 stores three-dimensional shape data and texture data corresponding to the three-dimensional shape data, and sends (transmits) a data set to the display control apparatus 2 in accordance with a request to send data (that is also referred to simply as request below) from the display control apparatus 2. The data set includes the three-dimensional shape data and the texture data.

On the basis of the data set received from the distribution server 1 and viewpoint information regarding the viewpoint of the user U received from the HMD 3, the display control apparatus 2 generates (renders) a display image at the viewpoint, and sends the display image to the HMD 3. In the present embodiment, the display image generated by the display control apparatus 2 includes a left-eye display image and a right-eye display image. The left-eye display image is displayed in front of the left eye of the user U by the HMD 3 described below. The right-eye display image is displayed in front of the right eye of the user U. In addition, the following also refers the left-eye display image and the right-eye display image collectively as stereo display image or simply as display image in some cases.

The HMD 3 is a display apparatus (display unit) that displays a stereo display image received from the display control apparatus 2. It is to be noted that the HMD 3 includes a sensor which acquires viewpoint information regarding the viewpoint of the user U wearing the HMD 3, and sends the viewpoint information to the display control apparatus 2.

The viewpoint information sent by the HMD 3 may include, for example, information indicating the position of the viewpoint of the user U and the attitude of the user U.

It is to be noted that FIG. 1 illustrates the display control apparatus 2 and the HMD 3 as different apparatuses, but the display control apparatus 2 and the HMD 3 may also be integrated. That is, one information processing apparatus may also have a function of the display control apparatus 2, and a function of the HMD 3 serving as a display unit which is worn on the head of a user and displays a left-eye display image and a right-eye display image.

The above-described configuration allows the transmission system 1000 to provide the user U with a stereoscopic effect brought about by binocular parallax and motion parallax.

Here, the above-described three-dimensional shape data and texture data corresponding to the three-dimensional shape data may be acquired, for example, by well-known three-dimensional capture technology that uses, for example, a method in which a distance measurement device such as a ToF (Time of Flight) sensor is used or a technique such as stereo matching is used. The following respectively refers the three-dimensional shape data and texture data acquired by this three-dimensional capture technology as original three-dimensional shape data and original texture data, and further refers to both collectively as original data in some cases.

This original data has an extremely large data amount in some cases. Therefore, the transmission load and the processing load are also heavy, and it is difficult under some conditions to perform a process within requested time. For example, depending on the band (band of the communication network 5) of the transmission path between the distribution server 1 and the display control apparatus 2, it may be difficult to transmit the original data as it is. In addition, depending on the processing performance (such as the processing speed of a processor and the size of a memory) of the display control apparatus 2, it may be difficult to generate a display image from the original data.

It is thus considered to change a data amount to be transmitted from the distribution server 1 to the display control apparatus 2 in accordance with such a load. Such a mechanism is described below.

The display control apparatus 2 sends a request including load information regarding a load to the distribution server 1. The load information may include, for example, at least one of transmission path band information regarding the band of the transmission path between the distribution server 1 and the display control apparatus 2 or processing performance information regarding the processing performance of the display control apparatus 2.

The distribution server 1 sends a data set including three-dimensional shape data and texture data corresponding to the three-dimensional shape data to the display control apparatus 2. The data set has the data amount corresponding to the load information included in the request received from the display control apparatus 2. Here, each of the three-dimensional shape data and texture data included in the data set to be sent may be data having a data amount reduced more than those of the original three-dimensional shape data and original texture data. A process of reducing the data amount may include, for example, a vertex reduction process of reducing a vertex included in the three-dimensional shape data.

As described above, changing the data amount to be transmitted from the distribution server 1 to the display control apparatus 2 in accordance with the load information may smooth the transmission and the generation of a display image. However, the subjective image quality of the display image may decrease along with a reduction in the data amount. For example, reducing a vertex included in the three-dimensional shape data may decrease the shape accuracy of the three-dimensional model corresponding to the three-dimensional shape data, and the subjective image quality of a display image may decrease. For example, the three-dimensional model corresponding to the three-dimensional shape data loses unevenness or the like, and it is possible as a result that a user is not able to obtain a stereoscopic effect.

Accordingly, focusing on the above-described circumstances, the present embodiment has been created. The distribution server 1 according to the present embodiment uses even a left camera image and right camera image to generate left-eye texture data and right-eye texture data. The left camera image and the right camera image are used to generate (capture) three-dimensional shape data. That is, a data set to be sent from the distribution server 1 according to the present embodiment to the display control apparatus 2 includes not a single piece of texture data, but multiple pieces of texture data: left-eye texture data; and right-eye texture data. The display control apparatus 2 then generates a left-eye display image and a right-eye display image on the basis of the three-dimensional shape data subjected to the vertex reduction process and the left-eye texture data and the right-eye texture data. The three-dimensional shape data, the left-eye texture data, and the right-eye texture data are included in the data set received from the distribution server 1. This configuration suppresses a decrease in the subjective image quality of a display image even in a case where the three-dimensional shape data subjected to the vertex reduction process is used for display. For example, it may be possible to reproduce unevenness, which is absent from the three-dimensional model corresponding to the three-dimensional shape data.

1-2. Flow of Process

The above has described the schematic configuration of the transmission system 1000 according to the present embodiment. Next, a schematic flow of a process of the transmission system 1000 according to the present embodiment is described.

As described above, the distribution server 1 according to the present embodiment sends the display control apparatus 2 the three-dimensional shape data and texture data each having a reduced data amount. Here, it is desirable to perform a process for reducing the data amount in advance. For example, a plurality of data sets having different data amounts may be generated and stored in advance on the basis of the original data. The distribution server 1 then selects a data set having the data amount corresponding to the load information from the plurality of stored data sets, and sends the selected data set to the display control apparatus 2. This allows the distribution server 1 to quickly respond to a request of the display control apparatus 2.

Accordingly, the following describes a flow of the process for generating a data set with reference to FIG. 2, and then describes a flow of a process for transmitting data with reference to FIG. 3.

(Process for Generating Data Set)

FIG. 2 is a schematic diagram schematically illustrating a flow of a process of generating a data set according to the present embodiment. The following describes an example in which the process of generating a data set illustrated in FIG.

2 is performed by the distribution server 1 illustrated in FIG. 1. The present technology is not, however, limited to this example. The process illustrated in FIG. 2 may be performed by another apparatus. The data set generated by the other apparatus in advance may be stored in the distribution server 1.

The distribution server 1 performs a process of reducing data included in a data set DS10, and generates a plurality of data sets DS11 to DS13. The generated data sets DS11 to DS13 are stored in the distribution server 1.

The data set DS10 illustrated in FIG. 2 includes original three-dimensional shape data F10, original texture data T10, a left camera image G10L, and a right camera image G10R. The original three-dimensional shape data F10 includes multiple pieces of vertex data V101 to V107. In addition, the left camera image G10L and the right camera image G10R may be images used to generate the original three-dimensional shape data F10. For example, the left camera image G10L is an image acquired by a left camera performing imaging, and the right camera image G10R is an image acquired by a right camera performing imaging. The left camera images an object from the left side. The right camera images an object from the right side.

As illustrated in FIG. 2, the generated data sets DS11 to DS13 respectively include pieces of three-dimensional shape data F11 to F13, and pieces of left-eye texture data T11L to T13L and pieces of right-eye texture data T11R to T13R. The pieces of left-eye texture data T11L to T13L and the pieces of right-eye texture data T11R to T13R correspond to the pieces of three-dimensional shape data F11 to F13. As illustrated in FIG. 2, the generated data sets DS11 to DS13 have different data amounts.

In the example illustrated in FIG. 2, the data set DS11 has the largest data amount of the data sets DS11 to DS13. In the example illustrated in FIG. 2, the three-dimensional shape data F11 included in the data set DS11 has not been subjected to the vertex reduction process. The number of pieces of vertex data V111 to V117 included in the three-dimensional shape data F11 is the same as the number of pieces of vertex data included in the original three-dimensional shape data F10. The present embodiment is not, however, limited to this example. The distribution server 1 may perform the vertex reduction processes on the pieces of three-dimensional shape data included in all the data sets that may be sent.

In contrast, the three-dimensional shape data F12 and three-dimensional shape data F13 included in the data set DS12 and data set DS13 are generated by performing the vertex reduction process on the original three-dimensional shape data F10. In the example illustrated in FIG. 2, pieces of vertex data V121 to V124 included in the three-dimensional shape data F12 are less than pieces of vertex data V101 to 107 included in the original three-dimensional shape data F10, and more than pieces of vertex data V131 to V132 included in the three-dimensional shape data F13. It is to be noted that the number of vertices (vertex count) included in each piece of three-dimensional shape data is not limited to the number of pieces of vertex data illustrated in FIG. 2.

In addition, the pieces of left-eye texture data T11L to T13L and pieces of right-eye texture data T11R to T13R included in the pieces of data set DS11 to DS12 may be generated to have the pixel counts corresponding to the vertex counts of the respective pieces of three-dimensional shape data F11 to F13. As illustrated in FIG. 2, as the corresponding three-dimensional shape data has a higher vertex count, the left-eye texture data and the right-eye texture data may each have a higher pixel count. This is because even an increase in the pixel count of each of the left-eye texture data and right-eye texture data does not considerably contribute to improvement in the image quality in a case where the three-dimensional shape data has a low vertex count. This configuration makes it possible to efficiently reduce the data amount.

It is to be noted that FIG. 2 illustrates an example in which the three data sets DS11 to DS13 are generated, but the number of data sets to be generated is not limited to the example illustrated in FIG. 2. As a larger number of data sets are generated, the data amount transmitted in accordance with the band of a transmission path and processing performance is more finely adjustable. However, depending on the number of data sets to be generated, the processing cost for generating the data sets and the retaining cost of the data sets are requested. It is thus desirable to determine the number of data sets to be generated by taking into consideration the processing cost and the retaining cost.

(Process for Transmitting Data)

FIG. 3 is a schematic diagram schematically illustrating a flow of a data transmission process according to the present embodiment. The distribution server 1 selects a data set to be sent to the display control apparatus 2 from the plurality of data sets DS11 to DS13 generated in advance as described above with reference to FIG. 2 (S11). In step S11, for example, on the basis of the load information included in a request received from the display control apparatus 2, the distribution server 1 may select a data set including three-dimensional shape data having the vertex count corresponding to the load information. Such selection makes it possible to adjust the transmission of a data set from the distribution server 1 to the display control apparatus 2 and the load for a rendering process performed by the display control apparatus 2.

Subsequently, the data set selected in step S11 is transmitted (sent) from the distribution server 1 to the display control apparatus 2 (S12). The display control apparatus 2 then generates (renders) a display image on the basis of the data set received from the distribution server 1 (S13). The display image generated in step S13 includes a left-eye display image D10L and a right-eye display image D10R. The left-eye display image D10L is displayed in front of the left eye of a user. The right-eye display image D10R is displayed in front of the right eye of the user. In addition, in step S13, the three-dimensional shape data and the left-eye texture data are used to generate the left-eye display image D10L, and the three-dimensional shape data and the right-eye texture data are used to generate the right-eye display image D10R.

The left-eye display image D10L and right-eye display image D10R generated by the display control apparatus 2 are displayed by the HMD 3 (S14).

2. Principle According to the Present Technology

The above has described the overview of the present embodiment. As described above, in the present embodiment, not a single piece of texture data, but left-eye texture data and right-eye texture data are transmitted. The transmitted left-eye texture data and right-eye texture data are then used to render a display image. This makes it possible to suppress a decrease in the image quality of the display image while reducing the data amount. Here, the technical principle is described that suppresses a decrease in the image quality of a display image by performing rendering by using left-eye texture data and right-eye texture data in the present embodiment. It is to be noted that the following description refers to the left-eye texture data and the right-eye texture data collectively as stereo texture data in some cases.

First, an association between three-dimensional shape data and texture data is described in a case of performing rendering by using a single piece of texture data with reference to FIGS. 4 and 5. FIG. 4 is an explanatory diagram for describing an association between a vertex of a three-dimensional model and a single piece of texture data. In addition, FIG. 5 is a diagram illustrating an example of the data structure of three-dimensional shape data.

FIG. 4 illustrates a three-dimensional model M21 that is a cube, and a single piece of texture data T21 corresponding to the three-dimensional model M21. Three-dimensional space coordinates $(x_0, y_0, z_0)$ indicating a vertex in the three-dimensional model M21 illustrated in FIG. 4 correspond to texture coordinates $(u_0, v_0)$ on texture data T21.

As illustrated in FIG. 5, in three-dimensional shape data F21 retained in a calculator, $(x_0, y_0, z_0, u_0, v_0)$ that is a combination of these corresponding coordinates may be treated as one piece of vertex data. Then, in the example illustrated in FIG. 5, N arrays of pieces of such vertex data are included in the three-dimensional shape data F21. That is, the three-dimensional shape data F21 includes information for associating the coordinates of a vertex in the three-dimensional model with the corresponding coordinates in the texture data.

Here, when three from each head of the three-dimensional shape data F21 illustrated in FIG. 5 are treated as a triangular patch, it is possible to form the three-dimensional model M21 in the three-dimensional space coordinate system of xyz illustrated in FIG. 4. The three-dimensional model M21 has a stereoscopic shape including a triangular patch group. Further, an association between the three-dimensional space coordinates (x, y, z) and the texture coordinates (u, v) makes it possible to acquire a triangular region in the texture data T21 corresponding to each triangular patch. Mapping (pasting) the triangular region to a triangular patch in the three-dimensional model M21 while transforming the triangular region with Affine transformation thus makes it possible to render a three-dimensional model using texture data.

The above has described an association between three-dimensional shape data and texture data in a case of performing rendering by using a single piece of texture data. Subsequently, an association between three-dimensional shape data and texture data is described for performing rendering by using stereo texture data in the present embodiment.

FIG. 6 is an explanatory diagram for describing an association between a vertex of a three-dimensional model and texture data in the present embodiment. FIG. 6 illustrates a three-dimensional model M22, and left-eye texture data T22L and right-eye texture data T22R. The three-dimensional model M22 is a cube. The left-eye texture data T22L and the right-eye texture data T22R correspond to the three-dimensional model M22.

Three-dimensional space coordinates $(x_0, y_0, z_0)$ indicating a vertex in the three-dimensional model M22 illustrated in FIG. 6 correspond to texture coordinates $(u_0, v_0)$ on left-eye texture data T22L. In addition, the three-dimensional space coordinates $(x_0, y_0, z_0)$ indicating the vertex in the three-dimensional model M22 illustrated in FIG. 6 similarly correspond to texture coordinates $(u_0, v_0)$ on right-eye texture data T22R.

As illustrated in FIG. 6, it is possible to represent texture coordinates in the left-eye texture data T22L and texture coordinates in the right-eye texture data T22R as the same coordinates. The texture coordinates in the left-eye texture data T22L and the texture coordinates in the right-eye texture data T22R correspond to the same vertex in the three-dimensional model M22. The data structure of three-dimensional shape data according to the present embodiment may be therefore similar to that of the example described with reference to FIG. 5.

FIG. 7 is a schematic diagram for describing rendering that uses stereo texture data in the present embodiment. As illustrated in FIG. 7, mapping the left-eye texture data T22L to the three-dimensional model M22 and performing rendering at the viewpoint corresponding to the left eye of a user make it possible to generate (render) a left-eye display image D22L. In addition, as illustrated in FIG. 7, mapping the right-eye texture data T22R to the three-dimensional model M22 and performing rendering at the viewpoint corresponding to the right eye of the user make it possible to generate (render) a right-eye display image D22R.

The process for performing rendering illustrated in FIG. 7 may be performed by the display control apparatus 2 illustrated in FIG. 1. It is to be noted that information of an association between a vertex position of a three-dimensional model with texture data is represented as three-dimensional shape data as described with reference to FIG. 5. The use of a data set received from the distribution server 1 thus allows the display control apparatus 2 to perform rendering as illustrated in FIG. 7. The data set includes three-dimensional shape data and stereo texture data corresponding to the three-dimensional shape data.

As described above, the use of stereo texture data for rendering the texture of a common three-dimensional model allows the rendered stereo display image to fuse at a position different from the surface of the three-dimensional model. This is the same as the principle that, for example, it is possible to provide a stereoscopic effect in spite of a flat display surface in a stereoscopic display that allows an image displayed on a flat screen to provide binocular parallax. The present technology suppresses a decrease in the subjective image quality of a display image rendered at a user viewpoint by using the effect that performing rendering by using such stereo texture allows unevenness different from that of the shape of the three-dimensional model to be recognized.

As described above, the original three-dimensional shape data is acquired by three-dimensional capture technology such as a method in which a distance measurement device is used or a method in which a technique such as stereo matching is used. The original three-dimensional shape data is acquired in various methods, but any of the methods may have an error.

In addition, even if it is possible to acquire a shape with high accuracy, a complicated shape requires an extremely large data amount or an extremely high vertex count of three-dimensional shape data to reproduce the shape with high accuracy. As described with reference to FIGS. 1 to 3, a data set including three-dimensional shape data subjected to the vertex reduction process is transmitted and used for rendering in accordance with the load information regarding the band of a transmission path, processing performance, or the like in the present embodiment. Thus, depending on the load information, three-dimensional shape data having an insufficient vertex count to reproduce a shape with high accuracy or three-dimensional shape data including an error may be used for rendering.

When rendering is performed by using three-dimensional shape data including an error caused by any of the acquisition (measurement), the transmission, or the process and a single piece of texture in this way, a shape including an error is reproduced and a user viewing a stereo display image also recognizes the shape including the error. In contrast, even in a case where three-dimensional shape data including such an error is used, the three-dimensional shape data and stereo texture are used to perform rendering in the present embodiment. This causes an error of a shape to look smaller, making it possible to suppress a decrease in the subjective image quality. The following describes the principle that such an error of a shape looks smaller in the present embodiment.

FIG. 8 is an explanatory diagram for describing an error in a three-dimensional model. FIG. 8 illustrates the true shape of a three-dimensional object OBJ31 having a protrusion (beak) and the shape of a three-dimensional model M32. The three-dimensional model M32 is three-dimensionally modeled on the three-dimensional object OBJ31 by three-dimensional capture technology. The three-dimensional object OBJ31 originally includes a protrusion B as illustrated in FIG. 8. In contrast, the three-dimensional model M32 has no protrusion because of an error caused by measurement or the like. It is to be noted that FIG. 8 illustrates, as a point P, the tip position corresponding to the tip of the protrusion B of the three-dimensional object OBJ31 in the three-dimensional space in which the three-dimensional model M32 is present.

Here, in a case where the three-dimensional shape data corresponding to the three-dimensional model M32 illustrated in FIG. 8 and a single piece of texture data are used to perform rendering, it is difficult for a user viewing the generated stereo display image to recognize the protrusion. In contrast, the use of stereo texture makes it possible to cause a protrusion to look present in the present embodiment even if the three-dimensional shape data corresponding to a three-dimensional model including an error like the three-dimensional model M32 is used to perform rendering.

To provide a stereoscopic effect brought about by stereo texture, texture data is used that is generated on the basis of a camera image acquired by a stereo camera disposed to have horizontal distance close to human interocular distance. The following describes the principle of texture data generation based on a camera image acquired by a stereo camera in the present embodiment.

FIG. 9 is a schematic diagram schematically illustrating imaging by a stereo camera. In FIG. 9, a left camera C31L and a right camera C31R are disposed as a stereo camera at substantially the same interval as the human interocular distance to allow the three-dimensional object OBJ31 to be imaged. It is to be noted that FIG. 9 illustrates the imaging ranges of the left camera C31L and the right camera C31R with one-dot chain lines.

The positional relationship between the stereo camera and the three-dimensional object corresponds to the positional relationship between the stereo camera and the three-dimensional model in the three-dimensional space. The known positional relationship between the stereo camera and the three-dimensional model in three-dimensional space makes it possible to generate the texture data corresponding to the three-dimensional model as follows from a camera image acquired by the stereo camera.

FIG. 10 is a schematic diagram schematically illustrating a flow of a process of generating texture data. It is possible to generate a perspective projection image from the positional relationship between a stereo camera and a three-dimensional model by making a perspective projection of the shape of the three-dimensional model viewed from each camera position on the perspective projection surface. In the example illustrated in FIG. 10, the three-dimensional model M32 is projected that is viewed from the position of a left camera C32L illustrated in FIG. 9, and a left perspective projection image P31L is generated. Similarly, the three-dimensional model M32 is projected that is viewed from the position of a right camera C32R illustrated in FIG. 9, and a right perspective projection image P31R is generated.

The composition of each perspective projection image is the same as that of a camera image acquired by each camera performing imaging. This makes it possible to establish an association between the perspective projection image and the camera image for each triangular region corresponding to a triangular patch including three vertices in a three-dimensional model. In the example illustrated in FIG. 10, a triangular region A31L corresponding to a triangular patch A30 of the three-dimensional model M32 in the left perspective projection image P31L and a triangular region A32L of a left camera image G32L are associated. Similarly, a triangular region A31R corresponding to the triangular patch A30 in the right perspective projection image P31R and a triangular region A32R of a right camera image G32R are associated.

It is possible to generate texture data by mapping (pasting) each triangular region in each camera image on the basis of an association for each triangular region acquired as described above while transforming the triangular region. In the example illustrated in FIG. 10, the triangular region A32L of the left camera image G32L is mapped to a triangular region A33L of left-eye texture data T33L, and a triangular region A32R of the right camera image G32R is mapped to the triangular region A33L of right-eye texture data T33R.

It is to be noted that a perspective projection image generated from a perspective projection from one camera position has a surface that does not have the three-dimensional model, and the texture data may thus have a region whose texture is not obtained from the camera image. In this case, for the region whose texture is not obtained from the camera image, texture may be acquired from the original texture data illustrated in FIG. 2, for example.

A case is considered where stereo texture is generated by using the three-dimensional model M32 including an error as illustrated in FIG. 10. FIG. 11 is a schematic diagram illustrating the relationship between the three-dimensional model M32 including an error and the stereo camera (left camera C31L and right camera C31R).

In FIG. 11, the arrow extending from each of the left camera C31L and the right camera C31R to the point P represents a light ray of the point P in an image that appears in each camera. The point P is the tip position of the protrusion present in the true shape. The three-dimensional model M32 has no protrusion because of an error. The respective arrows extending from the left camera C31L and the right camera C31R to the point P thus intersect at not the point P, but a point $P_R$ and a point $P_L$ on the surface of the three-dimensional model M32. Distance d between these point $P_R$ and point $P_L$ is mapped as it is as the positional difference between the left-eye texture data and the right-eye texture data, and recorded as it is as left-right parallax.

The left-eye texture data T33L and right-eye texture data T33R illustrated in FIG. 10 have a design difference because of this left-right parallax. The three-dimensional model M32 corresponding to the three-dimensional shape data has no protrusion. This causes the pattern of the protrusion to be recorded as having left-right parallax on texture.

In a case where the stereo texture data generated as described above is mapped to the three-dimensional model M32, and viewed and listened to from a camera position, it is possible to obtain a stereoscopic effect similar to that of the true shape even if the shape of the three-dimensional model M32 includes an error. FIG. 12 is a schematic diagram illustrating a viewing and listening situation in which a camera position and the position of an eye of a user match each other. In FIG. 12, a light ray represented as an arrow extends from the point $P_L$ to a left eye E32L of a user present at the position of the left camera C31L, and a light ray represented as an arrow extends from the point $P_R$ to a right eye E32R of the user present at the position of the right camera C31R. Here, it looks to the user like the texture at the point $P_L$ and the texture at the point $P_R$ fuse at the position of the point P at which the above-described two light rays intersect, and the surface of the three-dimensional model M32 is present at the position of the point P.

It is to be noted that FIG. 12 is only for the point P, but all the light rays appearing in the left and right cameras in addition to the point P are reproduced. This makes it possible to obtain the original stereoscopic effect even if the shape of the three-dimensional model M32 is different from the true shape. Moreover, in a case of viewing and listening with the camera positions matching with the positions of the eyes of a user, the light rays at the time of imaging by the cameras are reproduced and the true shape looks reproduced to the user even if the three-dimensional model M32 has any shape.

It is not, however, possible to reproduce the actual light rays if the shape of the three-dimensional model M32 includes an error in a case of viewing and listening at positions different from the camera positions. FIG. 13 is a schematic diagram illustrating a viewing and listening situation in which the camera position and the position of an eye of a user are different from each other. In the situation illustrated in FIG. 13, the texture at the point $P_L$ appearing in the left eye E32L of a user and the texture at the point $P_L$ appearing in the right eye E32R of the user fuse at a point P', and the surface of the three-dimensional model M32 looks present at the position of the point P'. Here, the point P' illustrated in FIG. 13 is a position different from the point P that is the true tip position of the protrusion. This is because the three-dimensional model M32 includes an error. The point P', however, looks present at a protruding position as compared with a case where the protrusion looks absent. This suppresses a decrease in the subjective image quality caused by an error even in a case of viewing and listening at positions different from the camera positions.

Here, an example of a case is described where a technique (that is referred to as existing technique below) for performing rendering by using a single piece of texture data in place of stereo texture data is used for the present embodiment as a comparative example. FIGS. 14 and 15 are explanatory diagrams each for describing a comparative example according to the present embodiment. FIGS. 14 and 15 are diagrams in a case of mapping a single piece of texture data to the three-dimensional model M32, and viewing and listening in the same positional relationships as those of FIGS. 12 and 13, respectively.

The existing technique does not allow left and right eyes to fuse points at different positions on the surface of the three-dimensional model M32 like the point $P_L$ and point $P_R$ in FIGS. 12 and 13. Therefore, in this comparative example, for example, as illustrated in FIGS. 14 and 15, a user uses the left and right eyes to view a common point $P_C$ positioned on the surface of the three-dimensional model M32. That is, the existing technique does not allow a user to recognize a point positioned on a protrusion in a case where the three-dimensional model M32 includes an error, but has no protrusion. In other words, it is not possible for the existing technique to render a point that looks present at a position out of the shape of the three-dimensional model M32 as illustrated in FIGS. 12 and 13.

As described above, according to the present embodiment, it is possible to have a user view a shape closer to the true shape as compared with the existing technique. In other words, performing rendering by using stereo texture makes it possible to suppress a decrease in the subjective image quality of a display image at each viewpoint in the present embodiment even in a case where the three-dimensional shape data corresponding to a three-dimensional shape model including an error is used for rendering.

The above has described the technical principle according to the present embodiment. Subsequently, configuration examples and operation examples of the distribution server 1 and the display control apparatus 2 are described one by one for achieving the above-described functions and processes.

3. Distribution Server

3-1. Configuration

FIG. 16 is a block diagram illustrating an example of the configuration of the distribution server 1 according to the present embodiment illustrated in FIG. 1. As illustrated in FIG. 16, the distribution server 1 is an information processing apparatus including a controller 10, a communication unit 17, and a storage unit 19.

The controller 10 controls each component of the distribution server 1. In addition, the controller 10 also functions as a data set generation unit 11, a communication control unit 13, and a selection unit 15 as illustrated in FIG. 16.

The data set generation unit 11 generates a plurality of data sets having different data amounts on the basis of the original three-dimensional shape data, the original texture data, the left camera image, and the right camera image as described with reference to FIG. 2.

FIG. 17 is a block diagram illustrating an example of the configuration of the data set generation unit 11. As illustrated in FIG. 17, the data set generation unit 11 includes a vertex reduction section 111, a perspective projection section 112, and a texture generation section 115.

The vertex reduction section 111 performs the vertex reduction process on the original three-dimensional shape data. The three-dimensional shape data outputted from the vertex reduction section 111 and subjected to the vertex reduction process is provided to the perspective projection section 112, and associated with stereo texture data described below. The three-dimensional shape data is then stored in the storage unit 19 as a data set. That is, the three-dimensional shape data included in the data set is generated by the vertex reduction section 111 performing the vertex reduction process.

FIG. 18 is an explanatory diagram illustrating the vertex reduction process by the vertex reduction section 111. As illustrated in FIG. 18, the six vertices and seven polygons of a three-dimensional model M41 corresponding to three-dimensional shape data that has not been subjected to the vertex reduction process are respectively reduced to the four vertices and three polygons of a three-dimensional model M42 corresponding to three-dimensional shape data that has been subjected to the vertex reduction process. Performing the vertex reduction process in this way makes a rougher shape, but allows data to be considerably reduced. This makes it possible to considerably reduce the loads for transmitting and processing data. It is to be noted that the technique of the vertex reduction section 111 for the vertex reduction process is not limited in particular, but, for example, a well-known vertex reduction technique such as QEM (Quadric Error Metrics) may be used.

FIG. 19 is a schematic diagram illustrating gradual vertex reduction. The example illustrated in FIG. 19 demonstrates that, as the vertex count becomes smaller in the order of three-dimensional models M51, M52, and M53, the shape becomes different and the pieces of respective vertex data included in pieces of three-dimensional shape data F51, F52, and F53 corresponding to the respective shapes have smaller data amounts.

It is to be noted that, in a case where a data set is generated in which there is no need to reduce a vertex of the three-dimensional shape data like the data set DS11 illustrated in FIG. 2, the vertex reduction section 111 does not have to perform the vertex reduction process, but may output the original three-dimensional shape data as it is.

FIG. 17 is referred to again, and the data set generation unit 11 is continuously described. The perspective projection section 112 makes perspective projections from the left and right camera positions corresponding to the left-eye texture data and right-eye texture data by using the three-dimensional shape data as described with reference to FIG. 10, and generates perspective projection images.

As illustrated in FIG. 17, the perspective projection section 112 includes a left perspective projector 113L and a right perspective projector 113R. The left perspective projector 113L makes a perspective projection of the shape of the three-dimensional model from the position of the left camera corresponding to the left-eye texture data to the perspective projection surface, and generates a left perspective projection image. The three-dimensional model corresponds to the three-dimensional shape data provided from the vertex reduction section 111. Similarly, the right perspective projector 113R makes a perspective projection of the shape of the three-dimensional model from the position of the left camera corresponding to the right-eye texture data to the perspective projection surface, and generates a right perspective projection image. The three-dimensional model corresponds to the three-dimensional shape data provided from the vertex reduction section 111.

The texture generation section 115 establishes associations between the perspective projection images generated by the perspective projection section 112 and the camera images, and maps the camera images to generate left-eye texture data and right-eye texture data as described with reference to FIG. 10. It is to be noted that the texture generation section 115 may establish an association between a perspective projection image and a camera image for each region (e.g., for each triangular region corresponding to a triangular patch) based on a vertex included in three-dimensional shape data as described with reference to FIG. 10.

As illustrated in FIG. 17, the texture generation section 115 includes a left generation processor 116L, a right generation processor 116R, a left resolution changer 117L, and a right resolution changer 117R.

The left generation processor 116L establishes an association between the left perspective projection image and the left camera image for each triangular region. The left generation processor 116L then maps a triangular region of the left camera image to the corresponding triangular region in the left-eye texture data to generate the left-eye texture data. The right generation processor 116R similarly establishes an association between the right perspective projection image and the right camera image for each triangular region. The right generation processor 116R then maps a triangular region of the left camera image to the corresponding triangular region in the right-eye texture data to generate the right-eye texture data. It is to be noted that the left generation processor 116L and the right generation processor 116R may each acquire texture from the original texture data for a region whose texture is not obtained from the camera image, and generate the texture data as described above.

The left resolution changer 117L performs a resolution change process on the left-eye texture data generated by the left generation processor 116L, and outputs the left-eye texture data. The right resolution changer 117R similarly performs the resolution change process on the right-eye texture data generated by the right generation processor 116R, and outputs the right-eye texture data. The left-eye texture data outputted from the left resolution changer 117L and the right-eye texture data outputted from the right resolution changer 117R are associated with the three-dimensional shape data outputted from the vertex reduction section 111, and stored in the storage unit 19 as a data set.

The left resolution changer 117L and the right resolution changer 117R may perform the resolution change processes to cause the left-eye texture data and right-eye texture data included in each data set to each have the pixel count corresponding to the vertex count of the three-dimensional shape data included in the data set. In a case where the three-dimensional shape data has a low vertex count, reducing the pixel count of each of the left-eye texture data and right-eye texture data does not lead to a considerable decrease in the image quality. This configuration thus makes it possible to efficiently reduce the data amount.

The above has described the configuration example of the data set generation unit 11 with reference to FIG. 17. It is to be noted that the data set generation unit 11 generates a plurality of data sets having different data amounts as described above. This allows the data set generation unit 11 to repeat the generation of a data set as the same times as the desired number of data sets while appropriately changing a parameter, for example, to gradually change the vertex count of the three-dimensional shape data included in the data set and the pixel count of each piece of texture data.

Alternatively, the controller 10 may include the plurality of data set generation units 11, and generate data sets in parallel. FIG. 20 is a schematic diagram schematically illustrating that data sets are generated in parallel in a case where the controller 10 includes the plurality of data set generation units 11.

N data set generation units 11-1 to 11-N illustrated in FIG. 20 may each have a configuration similar to that of the data set generation unit 11 illustrated in FIG. 17. The data set generation units 11-1 to 11-N respectively generate data sets DS-1 to DS-N on the basis of the original three-dimensional shape data, the original texture data, the left camera image, and the right camera image. The respective data sets DS-1 to DS-N include pieces of three-dimensional shape data having different vertex counts, and the pieces of left-eye texture data and right-eye texture data corresponding to the pieces of three-dimensional shape data.

As illustrated in FIG. 20, parallel processes make it possible to more efficiently generate a plurality of data sets having gradually different data amounts.

FIG. 16 is referred to again, and the controller 10 of the distribution server 1 is continuously described. The communication control unit 13 controls communication with another apparatus established by the communication unit 17. For example, the communication control unit 13 controls the communication unit 17 to cause the communication unit 17 to receive a request including the load information from the display control apparatus 2. In addition, the communication control unit 13 controls the communication unit 17 to cause the communication unit 17 to send a data set selected by the selection unit 15 described below to the display control apparatus 2 in accordance with the request received from the display control apparatus 2.

The selection unit 15 selects a data set to be sent by the communication unit 17 from a plurality of data sets generated by the data set generation unit 11 and stored in the storage unit 19 on the basis of the load information included in a request received by the communication unit 17. As described above, the selection unit 15 may select a data set including three-dimensional shape data having the vertex count corresponding to the load information, and the left-eye texture data and right-eye texture data corresponding to the three-dimensional shape data.

The load information may include transmission path band information regarding the band of the transmission path between the distribution server 1 and the display control apparatus 2 as described above. For example, in a case where the band of the transmission path between the distribution server 1 and the display control apparatus 2 is not sufficient wide to transmit the data amount of a data set including the original three-dimensional shape data, the selection unit 15 selects a data set including three-dimensional shape data having a lower vertex count than that of the original three-dimensional shape data.

For example, the HMD 3 finds a convenient use when allowing a user to freely walk around within some range. It is thus desirable that the HMD 3 establish wireless communication. Then, in a case where the display control apparatus 2 and the HMD 3 are integrated to provide the HMD 3 with the function of the display control apparatus 2, the transmission path between the distribution server 1 and the display control apparatus 2 (integrated with the HMD 3) is supposed to have a narrow band. In contrast, in a case where the display control apparatus 2 and the HMD 3 are different apparatuses and the display control apparatus 2 is coupled to the communication network 5 in a wired manner, the transmission path between the distribution server 1 and the display control apparatus 2 is supposed to have a wide band. In any of such cases, the selection unit 15 is able to appropriately select a data set on the basis of the band of the transmission path.

In addition, the load information may include processing performance information regarding the processing performance of the display control apparatus 2 as described above. The display control apparatus 2 may come in a variety of processing performances. The display control apparatus 2 and the HMD 3 may be different apparatuses, and the display control apparatus 2 may be high-spec PC having a high processing performance. Alternatively, in a case where the display control apparatus 2 and the HMD 3 are integrated and the HMD 3 has the function of the display control apparatus 2, the display control apparatus 2 has a lower processing performance than that of the high-spec PC in some cases. In addition, incorporating a smartphone into HMD also allows the smartphone to function as the display control apparatus 2 and the HMD 3. In this case, the display control apparatus 2 is supposed to have a lower processing performance. In any of such cases, the selection unit 15 is able to appropriately select a data set on the basis of the processing performance.

The communication unit 17 performs information communication with another apparatus under the control of the above-described communication control unit 13. For example, the communication unit 17 functions as a receiving unit, and receives a request including the load information regarding a load from the display control apparatus 2. In addition, the communication unit 17 functions as a sending unit, and sends a data set in accordance with the received request. The data set includes three-dimensional shape data having the vertex count corresponding to the load information, and left-eye texture data and right-eye texture data corresponding to the three-dimensional shape data.

The storage unit 19 stores a program and a parameter for causing each component of the distribution server 1 to function. For example, the storage unit 19 stores the above-described original three-dimensional shape data, original texture data, left camera image, and right camera image in advance, and provides the data set generation unit 11 therewith. In addition, the storage unit 19 stores a plurality of data sets generated by the data set generation unit 11.

3-2. Operation

The above has described the configuration example of the distribution server 1 according to the present embodiment. Next, an operation example of the distribution server 1 according to the present embodiment is described. It is to be noted that the distribution server 1 according to the present embodiment generates a plurality of data sets in advance, and sends a data set selected from the plurality of data sets to the display control apparatus 2 in accordance with a request from the display control apparatus 2 as described above. Accordingly, the following describes an operation example of the distribution server 1 for generating the data set with reference to FIG. 21, and then describes an operation example of the distribution server 1 for transmitting a data set with reference to FIG. 22.

FIG. 21 is a flowchart illustrating an operation example of the distribution server 1 for generating a data set. As illustrated in FIG. 21, the vertex reduction section 111 of the data set generation unit 11 first performs the vertex reduction process on the original three-dimensional shape data (S101).

Next, the perspective projection section 112 of the data set generation unit 11 uses the three-dimensional shape data subjected to the vertex reduction process in step S101 to make perspective projections from the left and right camera positions, and generates perspective projection images (S103).

Subsequently, the texture generation section 115 of the data set generation unit 11 establishes associations between the perspective projection images and the left and right camera images, and generates left-eye texture data and right-eye texture data (S105).

Further, the texture generation section 115 performs the resolution change processes on the left-eye texture data and right-eye texture data generated in step S105 to provide the left-eye texture data and the right-eye texture data with the pixel count corresponding to the vertex count of the three-dimensional shape data subjected to the vertex reduction process in step S101 (S107).

The data set generation unit 11 then associates the three-dimensional shape data subjected to the vertex reduction process in step S101 with the left-eye texture data and right-eye texture data each subjected to the resolution change process in step S107, and causes the storage unit 19 to store the three-dimensional shape data, and the left-eye texture data and the right-eye texture data as a data set (S109).

The above has described the operation example of the distribution server 1 for generating a data set with reference to FIG. 21. It is to be noted that the series of processes illustrated in FIG. 21 may be repeated as the same times as the desired number of data sets while a parameter is appropriately changed, for example, to gradually change the vertex count of the three-dimensional shape data included in the data set and the pixel count of each piece of texture data. Alternatively, the series of processes illustrated in FIG. 21 may be performed in parallel by the plurality of data set generation units 11 as illustrated in FIG. 20.

Next, an operation example of the distribution server 1 for transmitting a data set is described with reference to FIG. 22. FIG. 22 is a flowchart illustrating the operation example of the distribution server 1 for transmitting a data set. As illustrated in FIG. 22, the communication unit 17 first receives a request including the load information regarding a load from the display control apparatus 2 under the control of the communication control unit 13 (S151).

Next, the selection unit 15 selects a data set to be sent by the communication unit 17 from a plurality of data sets stored in the storage unit 19 on the basis of the load information included in the request received in step S151 (S153). As described above, the data set selected in step S153 includes three-dimensional shape data having the vertex count corresponding to the load information, and the left-eye texture data and right-eye texture data corresponding to the three-dimensional shape data.

Subsequently, the communication unit 17 sends the data set selected in step S153 to the display control apparatus 2 in accordance with the request under the control of the communication control unit 13 (S155). The request is received from the display control apparatus 2 in step S151.

4. Display Control Apparatus

4-1. Configuration

The above has described the configuration example and operation example of the distribution server 1 according to the present embodiment. Next, a configuration example of the display control apparatus 2 is described. FIG. 23 is a block diagram illustrating the configuration example of the display control apparatus 2 according to the present embodiment. As illustrated in FIG. 23, the display control apparatus 2 is an information processing apparatus including a controller 20, a communication unit 27, and a storage unit 29.

The controller 20 controls each component of the display control apparatus 2. In addition, the controller 20 also functions as a rendering unit 21 and a communication control unit 23 as illustrated in FIG. 23.

The rendering unit 21 generates (renders) a left-eye display image and a right-eye display image on the basis of a data set received by the communication unit 27 described below from the distribution server 1 as described above with reference to FIGS. 3, 7, and the like. In addition, on the basis of viewpoint information regarding the viewpoint of a user, the rendering unit 21 may also generate a left-eye display image and right-eye display image at the viewpoint. The viewpoint information is received by the communication unit 27 from the HMD 3.

The communication control unit 23 controls communication with another apparatus established by the communication unit 27. For example, the communication control unit 23 controls the communication unit 27 to cause the communication unit 27 to send the distribution server 1 a request including the load information regarding a load. It is to be noted that the communication control unit 23 may acquire the load information from the storage unit 29 or acquire the load information from the outside via the communication unit 27. In addition, the communication control unit 23 controls the communication unit 27 to cause the communication unit 27 to receive a data set from the distribution server 1. In addition, the communication control unit 23 controls the communication unit 27 to cause the communication unit 27 to receive the viewpoint information regarding the viewpoint of a user from the HMD 3. In addition, the communication control unit 23 controls the communication unit 27 to cause the communication unit 27 to send a left-eye display image and a right-eye display image to the HMD 3, and causes the HMD 3 to display the left-eye display image and the right-eye display image. The left-eye display image and the right-eye display image are generated by the rendering unit 21.

The communication unit 27 performs information communication with another apparatus under the control of the above-described communication control unit 23. For example, the communication unit 27 functions as a sending unit, and sends a request including the load information regarding a load to the distribution server 1. In addition, the communication unit 27 functions as a receiving unit, and receives a data set from the distribution server 1. The data set includes three-dimensional shape data having the vertex count corresponding to the load information, and left-eye texture data and right-eye texture data corresponding to the three-dimensional shape data. In addition, the communication unit 27 receives the viewpoint information regarding the viewpoint of a user from the HMD 3, and sends the HMD 3 a left-eye display image and right-eye display image generated by the rendering unit 21.

The storage unit 29 stores a program and a parameter for causing each component of the display control apparatus 2 to function. For example, the storage unit 29 may store the above-described load information.

4-2. Operation

The above has described the configuration example of the display control apparatus 2 according to the present embodiment. Next, an operation example of the display control apparatus 2 according to the present embodiment is described. FIG. 24 is a flowchart illustrating the operation example of the display control apparatus 2.

As illustrated in FIG. 24, the communication unit 27 first sends a request including the load information regarding a load to the distribution server 1 under the control of the communication control unit 23 (S201). Next, the communication unit 27 receives a data set from the distribution server 1 under the control of the communication control unit 23 (S203). As described above, the data set received in step S203 includes three-dimensional shape data having the vertex count corresponding to the load information, and the left-eye texture data and right-eye texture data corresponding to the three-dimensional shape data.

Next, the rendering unit 21 generates a left-eye display image and a right-eye display image on the basis of the data set received in step S203 (S205). Subsequently, the communication control unit 23 controls the communication unit 27 to cause the communication unit 27 to send a left-eye display image and a right-eye display image to the HMD 3, thereby causing the HMD 3 to display the left-eye display image and the right-eye display image. The left-eye display image and the right-eye display image are generated in step S205.

5. Modification Example

The above has described the embodiment of the present disclosure. The following describes some modification examples of the embodiment of the present disclosure. It is to be noted that the modification examples described below may be individually applied to the embodiment of the present disclosure or may be applied to the embodiment of the present disclosure in combination. In addition, each modification example may be applied in place of the configuration described in the embodiment of the present disclosure or may be additionally applied to the configuration described in the embodiment of the present disclosure.

5-1. Modification Example 1

In the above-described embodiment, the example has been described in which the selection unit 15 selects a data set to be sent by the communication unit 17 on the basis of the load information, but the present technology is not limited to this example. For example, further on the basis of the number of objects included in a data set to be sent by the communication unit 17, the selection unit 15 may select the data set to be sent by the communication unit 17. This example is described as a modification example 1.

FIG. 25 is an explanatory diagram for describing the modification example 1. In the present modification example, a data set may be generated for each object. Then, in the present modification example, the selection unit 15 may select a data set for each object. Further, as a data set to be sent by the communication unit 17 includes more objects, the selection unit 15 may select a data set having a smaller data amount. For example, the selection unit 15 may select data sets on the basis of the number of objects to cause data sets to be sent to have a constant total data amount. For example, in a case where objects double in number, a data set may be selected to cause each object to have half a data amount.

It is to be noted that the number of objects included in a data set to be sent by the communication unit 17 may be identified, for example, on the basis of the original data stored in the storage unit 19. In addition, in a case where the viewpoint information regarding the viewpoint of a user is obtained from the display control apparatus 2, the number of objects included in a data set to be sent by the communication unit 17 may be identified in accordance with the visual field of the user identified on the basis of the viewpoint information. FIG. 25 illustrates visual fields W11 to W13 of a user as an example.

The visual field W11 of the user includes one object OBJ111, and thus a data set to be sent by the communication unit 17 also includes one object. In this case, the selection unit 15 may select a data set DS21 including the three-dimensional shape data F21 having a large vertex count, and left-eye texture data T21L and right-eye texture data T21R each having a high pixel count as illustrated in FIG. 25. As a result, a data set DS31 to be sent includes three-dimensional shape data F31, and left-eye texture data T31L and right-eye texture data T31R as illustrated in FIG. 25.

The visual field W12 of the user includes two objects OBJ121 and OBJ122, and thus a data set to be sent by the communication unit 17 also includes two objects. In this case, the selection unit 15 may select, for each object, a data set DS22 including three-dimensional shape data F22 whose vertex count is reduced as compared with the three-dimensional shape data F21 as illustrated in FIG. 25. In addition, as illustrated in FIG. 25, the left-eye texture data T22L and right-eye texture data T22R included in the data set DS22 have lower pixel counts than those of the left-eye texture data T21L and right-eye texture data T21R. As a result, a data set DS32 to be sent includes pieces of three-dimensional shape data F32-1 and F32-2, and pieces of left-eye texture data T32-1L and T32-2L and pieces of right-eye texture data T32-1R and T32-2R as illustrated in FIG. 25.

The visual field W13 of the user includes three objects OBJ131, OBJ132, and OBJ133, and thus a data set to be sent by the communication unit 17 also includes three objects. In this case, the selection unit 15 may select, for each object, a data set DS23 including three-dimensional shape data F23 whose vertex count is further reduced as compared with the three-dimensional shape data F22 as illustrated in FIG. 25. In addition, as illustrated in FIG. 25, the left-eye texture data T23L and right-eye texture data T23R included in the data set DS23 have further lower pixel counts than those of the left-eye texture data T22L and right-eye texture data T22R. As a result, a data set DS33 to be sent includes pieces of three-dimensional shape data F33-1 to F33-3, and pieces of left-eye texture data T33-1L to T33-3L and pieces of right-eye texture data T33-1R to T33-3R as illustrated in FIG. 25.

As described above, according to the present modification example, selecting a data set to be sent further on the basis of the number of objects included in the data set makes it possible to send an appropriate data set.

5-2. Modification Example 2

In the above-described embodiment, the example has been described in which the distribution server 1 generates a data set, but the present technology is not limited to this example. For example, the function of the above-described data set generation unit 11 may be installed in another information processing apparatus. The other information processing apparatus may generate a plurality of data sets in advance, and provide the distribution server 1 therewith.

5-3. Modification Example 3

In addition, in the above-described embodiment, the example has been described in which two pieces of texture data are generated on the basis of the two camera images of a left camera image and a right camera image, but the present technology is not limited to this example. For example, three or more pieces of texture data may be generated on the basis of three or more camera images. In this case, two images of the three or more camera images may be regarded as a left camera image and a right camera image, and two pieces of texture data of the three or more pieces of generated texture data may be regarded as left-eye texture data and right-eye texture data.

It is to be noted that, in a case where three or more pieces of texture data are generated, the distribution server 1 may receive the viewpoint information from the display control apparatus 2, and select the left-eye texture and right-eye texture data included in a data set to be sent from the three or more pieces of texture data on the basis of the viewpoint information.

5-4. Modification Example 4

In the above-described embodiment, the example has been described in which three-dimensional shape data acquired on the basis of three-dimensional capture technology is the original three-dimensional shape data, but the present technology is not limited to this example. For example, three-dimensional shape data that is not based on sensing in real space, but generated on a computer is the original three-dimensional shape data, and the present technology is applicable. In this case, for example, a left camera image and a right camera image may be generated by imaging (rendering), with a virtual stereo camera, a three-dimensional model corresponding to the original three-dimensional shape data, and the present technology may be applied.

6. Hardware Configuration Example

The above has described the embodiment of the present disclosure. Finally, the hardware configuration of the information processing apparatus according to the embodiment of the present disclosure is described with reference to FIG. 26. FIG. 26 is a block diagram illustrating an example of the hardware configuration of the information processing apparatus according to the embodiment of the present disclosure. It is to be noted that an information processing apparatus 900 illustrated in FIG. 26 may achieve, for example, the distribution server 1, display control apparatus 2, and HMD 3 illustrated in FIGS. 1, 16, and 23. Information processing by the distribution server 1, display control apparatus 2, and HMD 3 according to the present embodiment is achieved in cooperation between software and hardware described below.

As illustrated in FIG. 26, the information processing apparatus 900 includes CPU (Central Processing Unit) 901, ROM (Read Only Memory) 902, RAM (Random Access Memory) 903, and a host bus 904a. In addition, the information processing apparatus 900 includes a bridge 904, an external bus 904b, an interface 905, an input device 906, an output device 907, a storage device 908, a drive 909, a coupling port 911, a communication device 913, and a sensor 915. The information processing apparatus 900 may include a processing circuit such as DSP or ASIC in place of or in addition to the CPU 901.

The CPU 901 functions as an arithmetic processing device and a control device, and controls the overall operation in the information processing apparatus 900 according to various programs. In addition, the CPU 901 may be a microprocessor. The ROM 902 stores a program to be used by the CPU 901, an arithmetic parameter, and the like. The RAM 903 temporarily stores a program used in execution of the CPU 901, a parameter appropriately changed in the execution, and the like. The CPU 901 may be included, for example, in the controller 10 and the controller 20.

The CPU 901, the ROM 902, and the RAM 903 are coupled to each other by the host bus 904a including a CPU bus and the like. The host bus 904a is coupled to the external bus 904b such as a PCI (Peripheral Component Interconnect/Interface) bus via the bridge 904. It is to be noted that the host bus 904a, the bridge 904, and the external bus 904b do not necessarily have to be separately included, but the functions thereof may be implemented in a single bus.

The input device 906 is achieved by a device through which a user inputs information, such as a mouse, a keyboard, a touch panel, a button, a microphone, a switch, and a lever, for example. In addition, the input device 906 may be a remote control device using infrared rays or other electric waves, or an external coupling device such as a mobile phone or PDA supporting an operation of the information processing apparatus 900, for example. Further, the input device 906 may include an input control circuit or the like that generates an input signal on the basis of information inputted by the user using the above-described input means and outputs the generated input signal to the CPU 901, for example. The user of the information processing apparatus 900 may input various kinds of data to the information processing apparatus 900 or instructs the information processing apparatus 900 to perform a processing operation by operating this input device 906.

The output device 907 includes a device that is able to visually or aurally notify a user of acquired information. Examples of such a device include a display device such as a CRT display device, a liquid crystal display device, a plasma display device, an EL display device, and a lamp, an audio output device such as a speaker and a headphone, a printing device, and the like. The output device 907 outputs results acquired through various kinds of processing performed by the information processing apparatus 900, for example. Specifically, the display device visually displays results acquired through various kinds of processing performed by the information processing apparatus 900, in various forms such as text, images, tables, and graphs. Meanwhile, the audio output device converts audio signals including reproduced audio data, acoustic data, and the like into analog signals, and aurally outputs the analog signals.

The storage device 908 is a device for data storage that is formed as an example of a storage unit of the information processing apparatus 900. For example, the storage device 908 is achieved by a magnetic storage unit device such as HDD, a semiconductor storage device, an optical storage device, a magneto-optical storage device, or the like. The storage device 908 may include a storage medium, a recording device that records data in the storage medium, a reading device that reads data from the storage medium, a deletion device that deletes data recorded in the storage medium, and the like. This storage device 908 stores a program to be executed by the CPU 901, various kinds of data, various kinds of data acquired from the outside, and the like. The above-described storage device 908 may be included, for example, in the storage unit 19 and the storage unit 29.

The drive 909 is a reader/writer for a storage medium, and is incorporated in or externally attached to the information processing apparatus 900. The drive 909 reads out information recorded in a removable storage medium such as a magnetic disk, optical disc, magneto-optical disk, or semiconductor memory mounted thereon, and outputs the information to the RAM 903. In addition, the drive 909 is also able to write information into the removable storage medium.

The coupling port 911 is an interface coupled to an external apparatus, and is a coupling port to an external apparatus that is able to transmit data through USB (Universal Serial Bus) and the like, for example.

The communication device 913 is a communication interface including, for example, a communication device and the like for coupling to a network 920. The communication device 913 is, for example, a communication card or the like for wired or wireless LAN (Local Area Network), LTE (Long Term Evolution), Bluetooth (registered trademark), or WUSB (Wireless USB). In addition, the communication device 913 may be a router for optical communication, a router for ADSL (Asymmetric Digital Subscriber Line), a modem for various kinds of communication, or the like. For example, this communication device 913 is able to transmit and receive signals and the like to and from the Internet and another communication device in accordance with a predetermined protocol such as, for example, TCP/IP. The communication device 913 may be included, for example, in the communication unit 17 and the communication unit 27.

The sensor 915 may be, for example, various sensors such as an acceleration sensor, a gyro sensor, a geomagnetic sensor, an optical sensor, a sound sensor, a ranging sensor, and a force sensor. The sensor 915 acquires information regarding the state of the information processing apparatus 900 itself such as the attitude and moving speed of the information processing apparatus 900, and information regarding the surrounding environment of the information processing apparatus 900 such as the brightness and noise around the information processing apparatus 900. In addition, the sensor 915 may include a GPS sensor that receives a GPS signal and measures the latitude, longitude, and altitude of the apparatus.

It is to be noted that the network 920 is a wired or wireless transmission path for information sent from an apparatus coupled to the network 920. For example, the network 920 may include a public network such as the Internet, a telephone network, or a satellite communication network, and various LANs (Local Area Networks) including Ethernet (registered trademark), WAN (Wide Area Network), and the like. In addition, the network 920 may include a private network such as IP-VPN (Internet Protocol-Virtual Private Network).

The above has described an example of the hardware configuration that makes it possible to achieve a function of the information processing apparatus 900 according to the embodiment of the present disclosure. The respective components described above may be achieved by using general-purpose members, or may be achieved by hardware specific to the functions of the respective components. It is thus possible to appropriately change hardware configurations to be utilized in accordance with a technical level at the time of carrying out the embodiment of the present disclosure.

It is to be noted that it is possible to create a computer program for achieving each function of the information processing apparatus 900 according to the embodiment of the present disclosure as described above and install the computer program in PC or the like. In addition, it is also possible to provide a computer-readable recording medium having such a computer program stored therein. The recording medium is, for example, a magnetic disk, an optical disc, a magneto-optical disk, a flash memory, or the like. In addition, the above-described computer program may be distributed, for example, via a network without using a recording medium.

7. Conclusion

According to the embodiment of the present disclosure as described above, it is possible to suppress a decrease in the subjective image quality of a display image generated on the basis of three-dimensional shape data.

A preferred embodiment(s) of the present disclosure has/have been described above in detail with reference to the accompanying drawings, but the technical scope of the present disclosure is not limited to such an embodiment(s). A person skilled in the art may find various alterations and modifications within the scope of the appended claims, and it should be understood that they will naturally come under the technical scope of the present disclosure.

For example, the respective steps in the above-described embodiment do not necessarily have to be processed in chronological order in accordance with the order described as a flowchart. For example, the respective steps in the processes according to the above-described embodiment may be processed in order different from the order described as a flowchart, or may be processed in parallel.

In addition, the effects described herein are merely illustrative and exemplary, but not limitative. That is, the technology according to the present disclosure may exert other effects that are apparent to those skilled in the art from the description herein, in addition to the above-described effects or in place of the above-described effects.

It is to be noted that the following configurations also fall within the technical scope of the present disclosure.

(1)

An information processing apparatus including:

a receiving unit that receives a request including load information regarding a load; and a sending unit that sends a data set in accordance with the request, the data set including three-dimensional shape data, and left-eye texture data and right-eye texture data, the three-dimensional shape data having a vertex count corresponding to the load information, the left-eye texture data and the right-eye texture data corresponding to the three-dimensional shape data.

(2)

The information processing apparatus according to (1), further including a selection unit that makes selection of the data set to be sent by the sending unit from a plurality of data sets on the basis of the load information, the plurality of data sets each including the three-dimensional shape data, and the left-eye texture data and the right-eye texture data, the left-eye texture data and the right-eye texture data corresponding to the three-dimensional shape data.

(3)

The information processing apparatus according to (2), in which the selection unit makes the selection further on the basis of a number of objects included in the data set to be sent by the sending unit.

(4)

The information processing apparatus according to (2) or (3), further including a data set generation unit that generates the plurality of data sets.

(5)

The information processing apparatus according to (4), in which the data set generation unit includes a vertex reduction section that generates the three-dimensional shape data through a vertex reduction process, the three-dimensional shape data being included in the data set.

(6)

The information processing apparatus according to (4) or (5), in which the data set generation unit further includes a perspective projection section that makes perspective projections from respective camera positions corresponding to the left-eye texture data and the right-eye texture data by using the three-dimensional shape data, and generates perspective projection images.

(7)

The information processing apparatus according to (6), in which the data set generation unit further includes a texture generation section that establishes associations between the perspective projection images and camera images, and generates the left-eye texture data and the right-eye texture data, the camera images being acquired by performing imaging from the camera positions.

(8)

The information processing apparatus according to (7), in which the texture generation section establishes the associations between the perspective projection images and the camera images for each region based on a vertex included in the three-dimensional shape data.

(9)

The information processing apparatus according to any one of (1) to (8), in which the left-eye texture data and the right-eye texture data each has a pixel count corresponding to a vertex count of the three-dimensional shape data, the left-eye texture data and the right-eye texture data being included in each data set, the three-dimensional shape data being included in the data set.

(10)

The information processing apparatus according to any one of (1) to (9), in which the load information includes transmission path band information regarding a band of a transmission path between a sending apparatus and the information processing apparatus, or processing performance information regarding processing performance of the sending apparatus, the sending apparatus sending the request.

(11)

An information processing apparatus including:
a sending unit that sends a request including load information regarding a load;
a receiving unit that receives a data set including three-dimensional shape data, and left-eye texture data and right-eye texture data, the three-dimensional shape data having a vertex count corresponding to the load information, the left-eye texture data and the right-eye texture data corresponding to the three-dimensional shape data; and
a rendering unit that generates a left-eye display image and a right-eye display image on the basis of the data set.

(12)

The information processing apparatus according to (11), in which the load information includes transmission path band information regarding a band of a transmission path between a receiving apparatus and the information processing apparatus, or processing performance information regarding processing performance of the information processing apparatus, the receiving apparatus receiving the request.

(13)

The information processing apparatus according to (11) or (12), in which the rendering unit generates the left-eye display image and the right-eye display image further on the basis of information regarding a viewpoint of a user.

(14)

The information processing apparatus according to (13), further including a display unit that is worn on a head of the user, and displays the left-eye display image and the right-eye display image.

(15)

An information processing method including:
receiving a request including load information regarding a load; and
causing, by a processor, a data set to be sent in accordance with the request, the data set including three-dimensional shape data, and left-eye texture data and right-eye texture data, the three-dimensional shape data having a vertex count corresponding to the load information, the left-eye texture data and the right-eye texture data corresponding to the three-dimensional shape data.

(16)

An information processing method including:
sending a request including load information regarding a load;
receiving a data set including three-dimensional shape data, and left-eye texture data and right-eye texture data, the three-dimensional shape data having a vertex count corresponding to the load information, the left-eye texture data and the right-eye texture data corresponding to the three-dimensional shape data; and
generating, by a processor, a left-eye display image and a right-eye display image on the basis of the data set.

REFERENCE SIGNS LIST 1 distribution server
2 display control apparatus
3 HMD
5 communication network
10 controller
11 data set generation unit
13 communication control unit
15 selection unit
17 communication unit
19 storage unit
20 controller
21 rendering unit
23 communication control unit
27 communication unit
29 storage unit
111 vertex reduction section
112 perspective projection section
115 texture generation section

The invention claimed is:

1. An information processing apparatus, comprising:
a first communication interface configured to:
receive a request that includes load information associated with a load; and
a central processing unit (CPU) configured to select, from a plurality of data sets, data set to be sent by the first communication interface, wherein
the data set to be sent is selected based on a count of objects in the data set,
the data set includes a three-dimensional shape data, a left-eye texture data and, a right-eye texture data,
the three-dimensional shape data having a vertex count corresponding to the load information,
the left-eye texture data and the right-eye texture data corresponding to the three-dimensional shape data, and
the first communication interface is further configured to send the selected data set based on the received request.

2. The information processing apparatus according to claim 1, wherein
the CPU is further configured to select the data set to be sent from the plurality of data sets based on the load information, and
each of the plurality of data sets includes the three-dimensional shape data, the left-eye texture data and the right-eye texture data.

3. The information processing apparatus according to claim 2, wherein the CPU is further configured to generate the plurality of data sets.

4. The information processing apparatus according to claim 3, wherein the CPU is further configured to generate the three-dimensional shape data based on a vertex reduction process.

5. The information processing apparatus according to claim 3, wherein the CPU is further configured to:
make perspective projections from respective camera positions corresponding to the left-eye texture data and the right-eye texture data based on the three-dimensional shape data; and generate perspective projection images based on the perspective projections from the respective camera positions.

6. The information processing apparatus according to claim 5, wherein the CPU is further configured to:
establish associations between the perspective projection images and camera images; and
generate the left-eye texture data and the right-eye texture data based on the associations between the perspective projection images and the camera images, wherein
the camera images are based on imaging from the respective camera positions.

7. The information processing apparatus according to claim 6, wherein the CPU is further configured to establish the associations between the perspective projection images and the camera images for each region of the camera images based on a vertex in the three-dimensional shape data.

8. The information processing apparatus according to claim 1, wherein
each of the left-eye texture data and the right-eye texture data has a pixel count corresponding to a vertex count of the three-dimensional shape data.

9. The information processing apparatus according to claim 1, wherein the load information includes one of transmission path band information or processing performance information, wherein
the transmission path band information is associated with a band of a transmission path between a second communication interface and the first communication interface, and
processing performance information is associated with processing performance of the second communication interface.

10. An information processing apparatus, comprising:
a first communication interface configured to:
send a request that includes load information associated with a load;
receive a data set based on the load information, wherein
the data set is selected from a plurality of a data sets based on a count of objects in the data set,
the data set includes a three-dimensional shape data, a left-eye texture data and, a right-eye texture data,
the three-dimensional shape data having a vertex count corresponding to the load information, and
the left-eye texture data and the right-eye texture data corresponds to the three-dimensional shape data; and
a central processing unit (CPU) configured to generate a left-eye display image and a right-eye display image based on the data set.

11. The information processing apparatus according to claim 10, wherein the load information includes one of transmission path band information or processing performance information, wherein
the transmission path band information is associated with a band of a transmission path between a second communication interface and the first communication interface, and
processing performance information is associated with processing performance of the second communication interface.

12. The information processing apparatus according to claim 10, wherein the CPU is further configured to generate the left-eye display image and the right-eye display image based on information associated with a viewpoint of a user.

13. The information processing apparatus according to claim 12, further comprising a head mounted display wearable on a head of the user, wherein the head mounted display is configured to display the left-eye display image and the right-eye display image.

14. An information processing method, comprising:
receiving a request, by a communication interface, that includes load information associated with a load; and
selecting, from a plurality of data sets, data set to be sent by the first communication interface, wherein
the data set to be sent is selected based on a count of objects in the data set,
the data set includes three-dimensional shape data, left-eye texture data and right-eye texture data,
the three-dimensional shape data having a vertex count corresponding to the load information, and
the left-eye texture data and the right-eye texture data corresponding to the three-dimensional shape data, wherein
sending, by the communication interface, the selected data set based on the received request.

* * * * *